US008458591B2

(12) United States Patent
Shirasaki

(10) Patent No.: US 8,458,591 B2
(45) Date of Patent: Jun. 4, 2013

(54) IMAGE PICKUP APPARATUS, METHOD FOR CONTROLLING DISPLAY OF IMAGE PICKUP APPARATUS, AND COMPUTER PROGRAM FOR EXECUTING METHOD FOR CONTROLLING DISPLAY OF IMAGE PICKUP APPARATUS

(75) Inventor: Kaori Shirasaki, Aichi (JP)

(73) Assignee: Sony Corporation, Tokyo (JP)

( * ) Notice: Subject to any disclaimer, the term of this patent is extended or adjusted under 35 U.S.C. 154(b) by 952 days.

(21) Appl. No.: 11/869,325

(22) Filed: Oct. 9, 2007

(65) Prior Publication Data

US 2008/0201637 A1   Aug. 21, 2008

(30) Foreign Application Priority Data

Nov. 6, 2006   (JP) ................. 2006-300856

(51) Int. Cl.
*G06F 3/048*       (2006.01)
(52) U.S. Cl.
USPC ............................ 715/705; 715/864; 386/223
(58) Field of Classification Search
USPC .................................. 715/705, 864; 386/223
See application file for complete search history.

(56) References Cited

U.S. PATENT DOCUMENTS

| 2006/0082802 A1* | 4/2006 | Furuya ..................... 358/1.13 |
| 2006/0184900 A1* | 8/2006 | Ishii et al. .................. 715/835 |

FOREIGN PATENT DOCUMENTS

| JP | 63-301093 | 12/1988 |
| JP | 09-116792 | * 2/1997 |
| JP | 9-116792 | 5/1997 |
| JP | 2002-84447 | 3/2002 |
| JP | 2005-175616 | 6/2005 |
| JP | 2006-171107 | 6/2006 |
| JP | 2006-186589 | 7/2006 |

OTHER PUBLICATIONS

English translation of JP2005-175616 (machine translation from PAJ, www.19.ipdl.inpit.go.jp/PA1/cgi-bin/PA1INDEPX).*

* cited by examiner

*Primary Examiner* — Andrea Leggett
(74) *Attorney, Agent, or Firm* — Oblon, Spivak, McClelland, Maier & Neustadt, L.L.P.

(57) ABSTRACT

An image pickup apparatus includes a touch panel used for displaying various screens, each including a plurality of buttons from which a user selects a desired button, a menu screen display controlling unit for controlling the touch panel to sequentially display menu screens through which the user navigates to a setting screen for setting a predetermined function in accordance with the selected buttons, and a guide screen display controlling unit for controlling the touch panel to sequentially display guide screens through which the user navigates to the setting screen in accordance with the selected buttons in a path different from that of the menu screens, each of the guide screens displaying a button or description regarding at least the purpose or effect of the operation. An initial screen of the touch panel includes a menu button for entering the menu screen and a guide button for entering the guide screen.

12 Claims, 18 Drawing Sheets

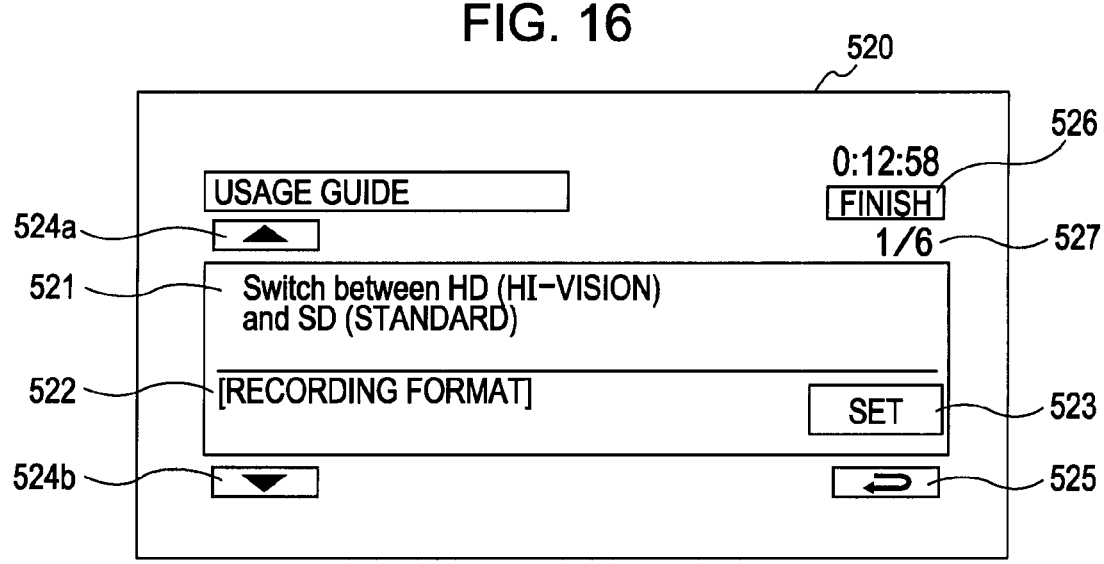
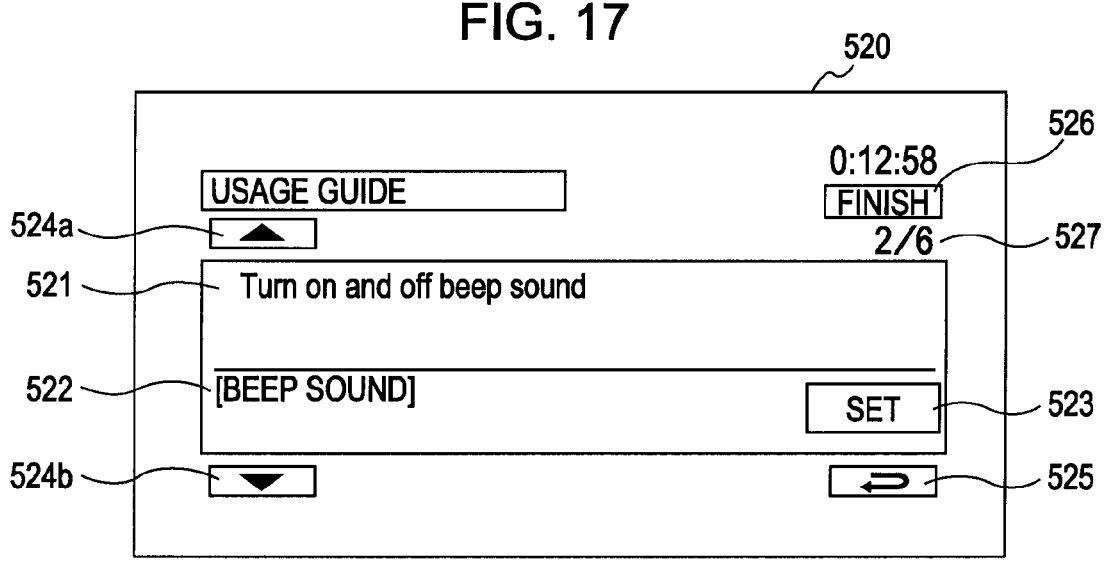

FIG. 25
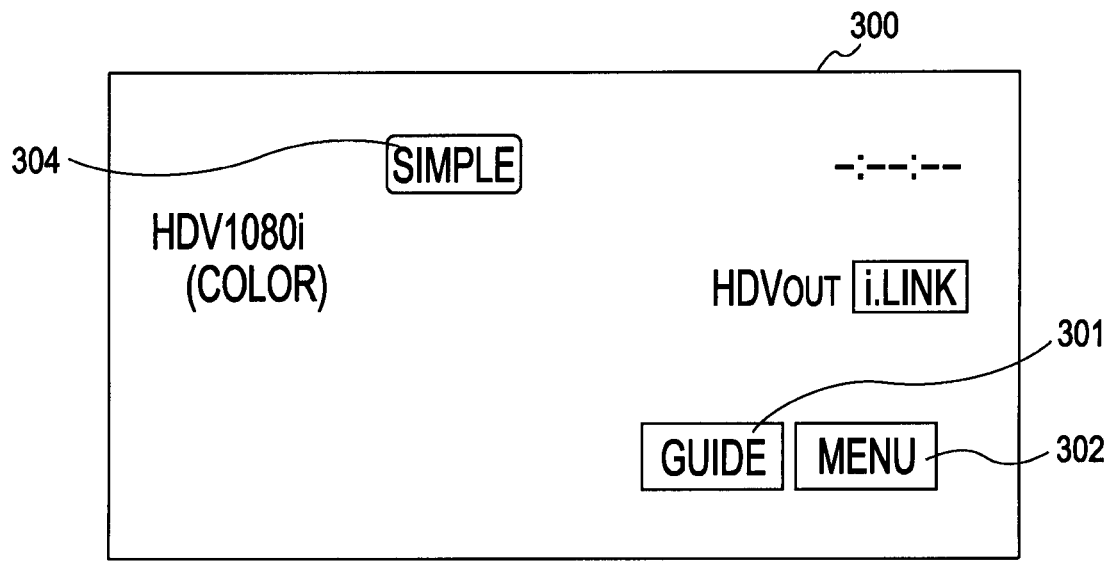
PRESS [×]  ↑↓  PRESS [MENU]
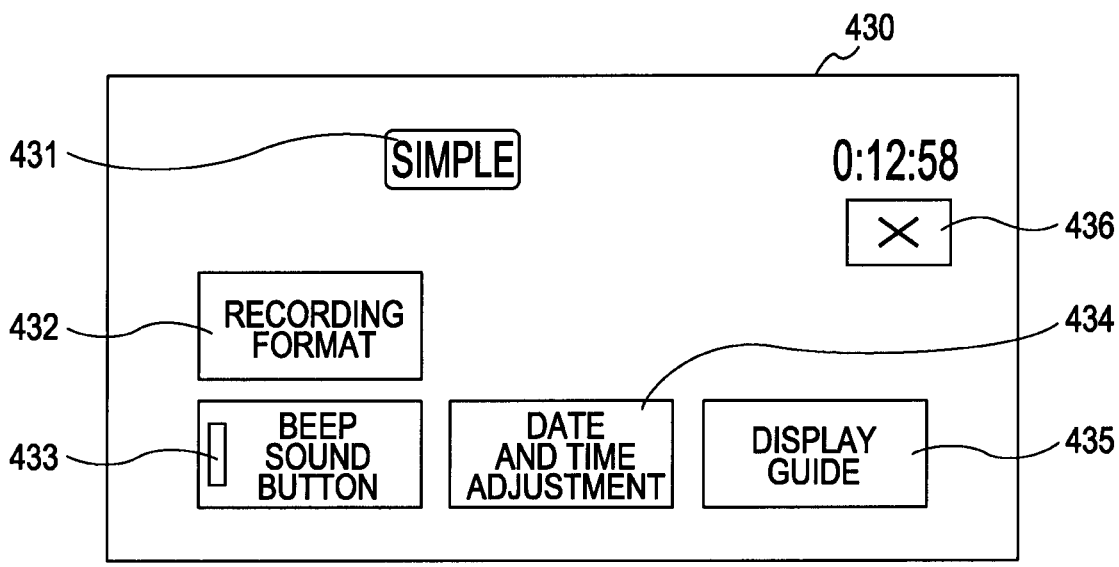

FIG. 27
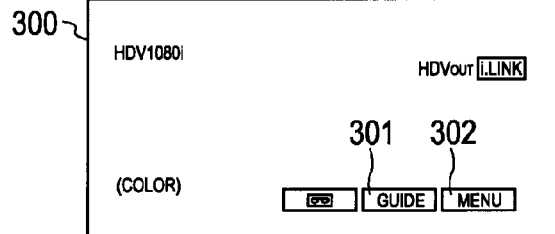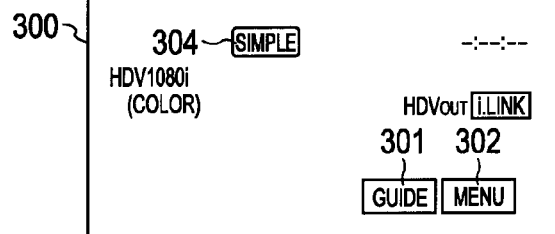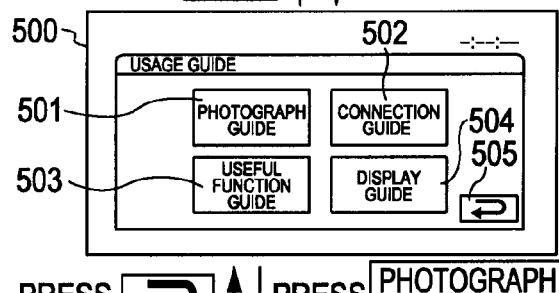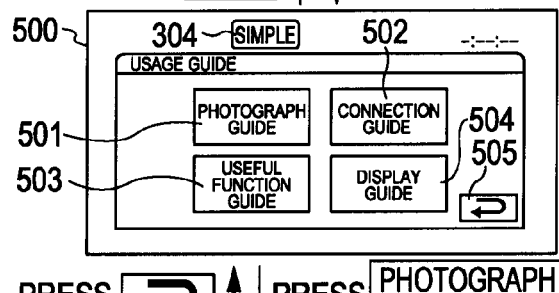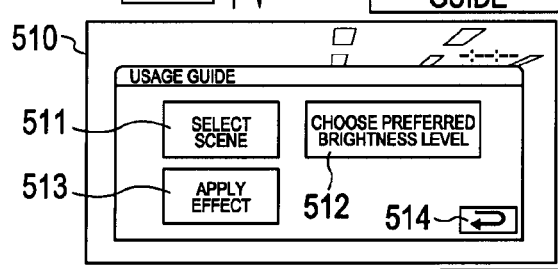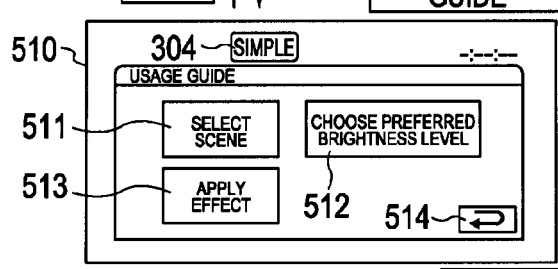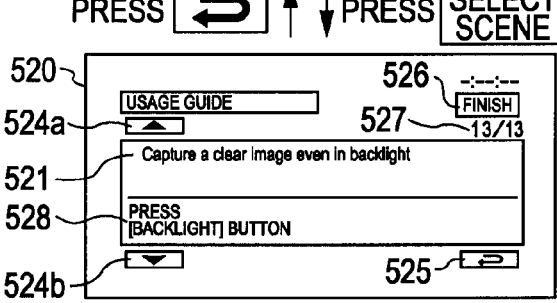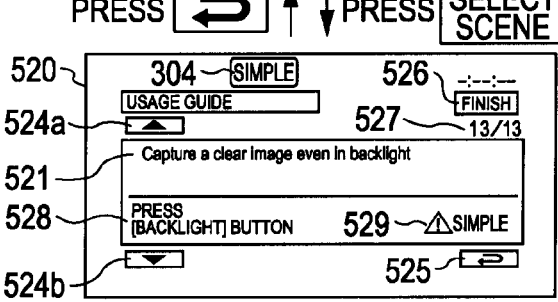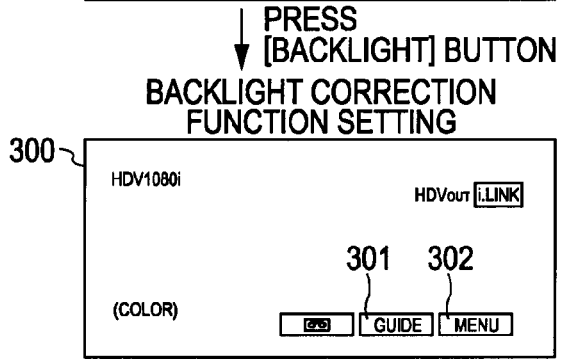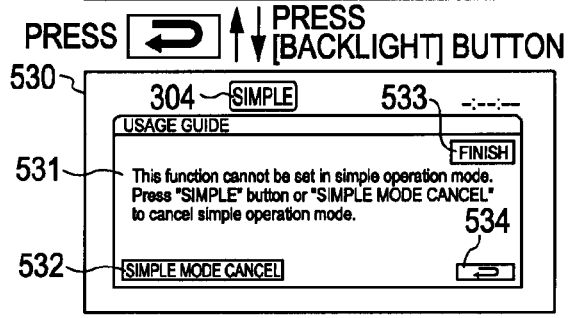

IMAGE PICKUP APPARATUS, METHOD FOR CONTROLLING DISPLAY OF IMAGE PICKUP APPARATUS, AND COMPUTER PROGRAM FOR EXECUTING METHOD FOR CONTROLLING DISPLAY OF IMAGE PICKUP APPARATUS

CROSS REFERENCES TO RELATED APPLICATIONS

The present invention contains subject matter related to Japanese Patent Application JP 2006-300856 filed in the Japanese Patent Office on Nov. 6, 2006, the entire contents of which are incorporated herein by reference.

BACKGROUND OF THE INVENTION

1. Field of the Invention

The present invention relates to an image pickup apparatus and, in particular, to an image pickup apparatus capable of setting a variety of functions relating to image capturing and playback display, a method for controlling display of setting, and a program for causing a computer to execute processes according to the method.

2. Description of the Related Art

Recently, a variety of functions of digital still cameras and digital video cameras have been developed in order to provide high-quality and excellent images to users. When the users use a desired function, such image pickup apparatuses having a variety of functions require setting of the desired function.

For example, in order for the users to perform setting of a desired function, some image pickup apparatuses provide the users with a touch panel including a plurality of operation buttons displayed thereon.

To help the users find a desired function, each of the plurality of operation buttons displayed on the touch panel of the image pickup apparatuses has a name displayed thereon. However, the length of the name is limited to a predetermined value in order to display a large number of buttons on the touch panel. Such a display method is relatively suitable for users who are accustomed to the name of the buttons after carefully reading the manual and are familiar with the operation of the image pickup apparatus. However, for users who are unfamiliar with the operation of the image pickup apparatus or novice users, it is difficult to understand which operations the names of the buttons correspond to. Thus, setting of each of the functions is difficult for the users.

To enable easy setting of the functions even for novice users, a display control unit has been developed that acquires user identification information indicating whether the user is a novice user or an experienced user through an operation of a user mode switch and changes the number of operation buttons displayed on a display unit thereof (refer to, for example, Japanese Unexamined Patent Application Publication No. 2006-186589 and, in particular, FIG. 9). That is, only operation buttons regarding basic functions can be displayed for novice users.

SUMMARY OF THE INVENTION

In the above-described existing technology, since only operation buttons regarding basic functions are displayed on the display unit, a novice user can easily operate the operation buttons regarding basic functions.

However, the display on the display unit is switched by using the user mode switch. Accordingly, if a user does not know the presence of the user mode switch, the user cannot switch the display on the display unit, and therefore, it is difficult for the user to perform setting of each function.

In addition, even a novice user desires to use a function other than the basic functions. In such a case, the user needs to change the display of operation buttons to an original display. Accordingly, it is difficult for users who are unfamiliar with the operation of the image pickup apparatus to perform setting of each function.

The functions of an image pickup apparatus are grouped into similar categories, and operation buttons corresponding to the categories are displayed on the touch panel. When the user performs setting of a desired function, the user sequentially select the operation buttons corresponding to the item including a desired function so that a setting screen used for setting the desired function is displayed. Thus, the user can perform setting of the desired function through the setting screen. As described above, the user needs to sequentially press a predetermined operation button in order to obtain the setting screen displayed on the touch panel.

However, users who are unfamiliar with the operations of the image pickup apparatus cannot sometimes recognize which operation the name of a button corresponds to even for the operation buttons regarding the basic operations. In such a case, every time the user performs setting of a function, the user needs to consult the operation manual of the image pickup apparatus or guess which function the operation button corresponds to by the name of the operation button. As a result, the operation of setting a desired function is troublesome for the users.

Accordingly, the present invention provides an easy operation of setting a function of an image pickup apparatus to users when the users perform setting of a desired function.

According to an embodiment of the present invention, an image pickup apparatus includes a touch panel used for displaying a variety of screens, each including a plurality of buttons displayed therein, where the touch panel allows a user to select a desired button from among the plurality of buttons, menu screen display controlling means for controlling the touch panel so as to sequentially display menu screens through which the user navigates to a setting screen for setting a predetermined function by a predetermined operation in accordance with the selected buttons, and guide screen display controlling means for controlling the touch panel so as to sequentially display guide screens through which the user navigates to the setting screen in accordance with the selected buttons in a path different from a path of the menu screens, each of the guide screens displaying a button or description regarding at least one of the purpose and the effect of the operation. An initial screen of the touch panel includes a menu button for advancing to the menu screen and a guide button for advancing to the guide screen. In this way, the image pickup apparatus displays the guide button in the initial screen of the touch panel for advancing the guide screen from which the user navigates to a setting screen. The user navigates to the setting screen on the basis of at least one of the purpose and the effect of the operation.

The menu button and the guide button can be displayed on the touch panel when the image pickup apparatus is started. Since the guide button is displayed on the touch panel when the image pickup apparatus is started, almost all the users can recognize the presence of the guide button.

The setting screen displayed after the menu screens are sequentially displayed by the menu screen display controlling means can be the same as the setting screen displayed after the guide screens are sequentially displayed by the guide screen display controlling means if the functions to be set are the same. When the setting screen displayed after the menu screens are sequentially displayed is the same as the setting screen displayed after the guide screens are sequentially displayed, the user of the image pickup apparatus can easily be aware of the presence of a variety of functions and set the variety of functions easily.

The image pickup apparatus can further include selected screen storage means for, when the setting screen is displayed on the touch panel after the guide screens are sequentially displayed, storing one of the guide screens displayed immediately preceding the setting screen. When the guide screen display controlling means displays a guide screen in the guide path the same as that of the guide screen stored in the selected screen storage means, the guide screen display controlling means displays the guide screen stored in the selected screen storage means immediately preceding the setting screen. In this way, the image pickup apparatus can rapidly display the guide screen most recently used by the user.

One of the guide screens displayed immediately preceding the setting screen among the guide screens sequentially displayed by the guide screen display controlling means can be a screen for displaying the purpose or effect of only one operation per screen so as to guide a user to a setting screen regarding the purpose or effect of the operation. Since only one of the purpose and the effect of an operation is displayed per screen, the user can easily understand the description displayed in the screen.

A button for setting a predetermined function can be displayed in the initial screen of the touch panel in place of the guide button. In this way, a screen can be displayed for the user in accordance with the operation skill of the user.

The image pickup apparatus can further include simple operation mode setting means for setting a simple operation mode in which only particular functions are capable of being set. When the simple operation mode is set by the simple operation mode setting means and a setting screen displayed after the guide screens are sequentially displayed by the guide screen display controlling means is a setting screen of a function not capable of being set in the simple operation mode, one of a cancel button for canceling the simple operation mode and description of an operation for canceling the simple operation mode is displayed in one of the guide screens that is displayed immediately preceding the setting screen. In this way, the users who operate the image pickup apparatus only in the simple operation mode can easily be aware of the presence of a variety of functions and set the variety of functions easily.

At least one of the display size of the guide button, the position of the guide button on the touch panel, the color of the guide button, the presence/absence of the guide button, and the displayed description of the guide button can be changed. In this way, a screen optimal for an individual user can be displayed.

According to another embodiment of the present invention, an image pickup apparatus includes an operation member mounted on a casing of the image pickup apparatus, where the operation member is used for setting a predetermined function through a predetermined operation, a touch panel used for displaying a variety of screens, each including a plurality of buttons displayed therein, the touch panel allowing a desired button to be selected from among the plurality of buttons, and guide screen display controlling means for controlling the touch panel so as to sequentially display guide screens, each including a button regarding at least one of the purpose and the effect of an operation. The user navigates to a description screen that describes the operation of the operation member through the guide screens in accordance with the selected button. In this way, the image pickup apparatus sequentially displays the guide screens on the touch panel through which the user navigates to a description screen that describes how to operate the operation member. The user can navigate to the description screen on the basis of at least one of the purpose and the effect of the operation.

The image pickup apparatus can further include simple operation mode setting means for setting a simple operation mode in which only particular functions are capable of being set. When the simple operation mode is set by the simple operation mode setting means and a description screen displayed after the guide screens are sequentially displayed by the guide screen display controlling means is a description screen of a function not capable of being set in the simple operation mode, one of a cancel button for canceling the simple operation mode and a description of an operation for canceling the simple operation mode is displayed immediately after the operation of the operation member regarding the description screen is performed. In this way, the users who operate the image pickup apparatus only in the simple operation mode can easily be aware of the presence of a variety of functions and set the variety of functions easily.

The present invention provides an advantage in that when a user sets a desired function, the user can easily operate the image pickup apparatus for the setting.

BRIEF DESCRIPTION OF THE DRAWINGS

FIG. 16 illustrates an example of transition of a display screen displayed on the touch panel;

FIG. 17 illustrates an example of transition of a display screen displayed on the touch panel;

FIG. 25 illustrates an example of transition of a display screen on the touch panel when a simple operation mode is set for the image pickup apparatus;

FIG. 27 illustrates examples of transition of a display screen on the touch panel when the simple operation mode is set for the image pickup apparatus and when the normal operation mode is set for the image pickup apparatus.

DESCRIPTION OF THE PREFERRED EMBODIMENTS

Embodiments of the present invention are described in detail with reference to the accompanying drawings.

Figure 1:
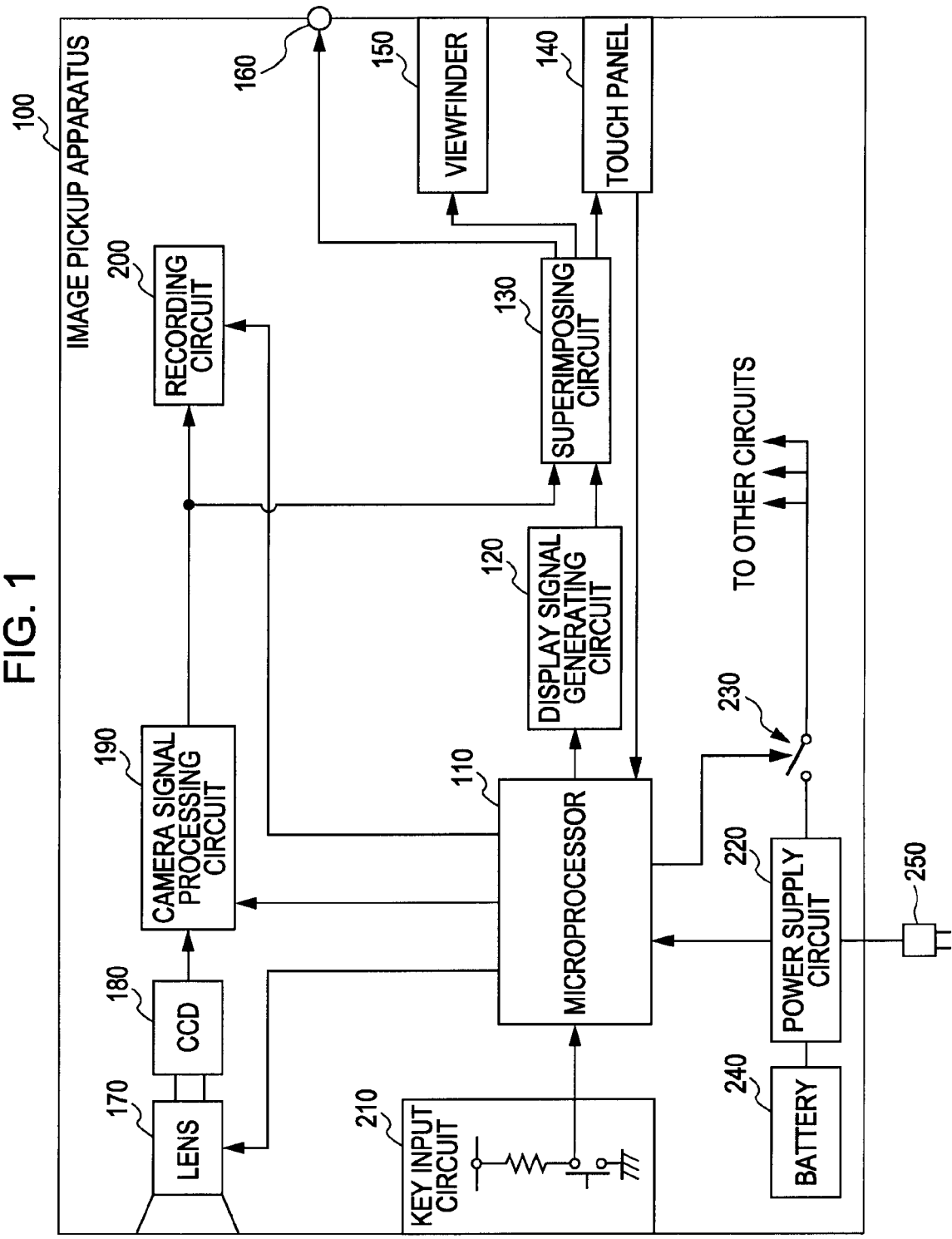
FIG. 1 is a block diagram of an example functional structure of an image pickup apparatus according to an embodiment the present invention.

FIG. 1 is a block diagram of an example functional structure of an image pickup apparatus 100 according to an embodiment the present invention.

The image pickup apparatus 100 includes a microprocessor 110, a display signal generating circuit 120, a superimposing circuit 130, a touch panel 140, a viewfinder 150, an output terminal 160, a lens 170, a charged coupled device (CCD) 180, a camera signal processing circuit 190, a recording circuit 200, a key input circuit 210, a power supply circuit 220, a power supply control circuit 230, a battery 240, and an AC cable 250.

The microprocessor 110 controls each of components of the image pickup apparatus 100 in accordance with a control program stored in a memory (not shown). In addition, the microprocessor 110 determines which button is currently pressed on the basis of values obtained by A/D converting the input voltages input from the touch panel 140 or the key input circuit 210. Subsequently, the microprocessor 110 outputs a command to the display signal generating circuit 120 in accordance with the determination result.

The display signal generating circuit 120 includes a video random access memory (VRAM) for storing a variety of images to be displayed on the touch panel 140. The display signal generating circuit 120 analyzes the command output from the microprocessor 110 so as to output a display signal generated on the VRAM on the basis of the analyzed command to the superimposing circuit 130 on a scan-line to scan-line basis. Furthermore, the display signal generating circuit 120 expands bitmap data output from the microprocessor 110 on the VRAM, and outputs a display signal corresponding to the bitmap data expanded on the VRAM to the superimposing circuit 130 on a scan-line to scan-line basis.

The superimposing circuit 130 superimposes a video signal output from the camera signal processing circuit 190 onto the display signal output from the display signal generating circuit 120. The superimposing circuit 130 then outputs the superimposed image signal to the touch panel 140, the viewfinder 150, and the output terminal 160.

The touch panel 140 displays an image corresponding to the image signal output from the superimposing circuit 130 on a liquid crystal display (LCD) panel. In addition, the touch panel 140 converts a touch on the LCD panel into an electrical signal and outputs the electrical signal to the microprocessor 110. Furthermore, the touch panel 140 displays a plurality of buttons on a variety of screens and prompts a user to select a desired button from among the plurality of buttons.

The viewfinder 150 is a display unit for displaying an image to be captured by the image pickup apparatus 100 and a playback image. The viewfinder 150 displays an image corresponding to an image signal output from the superimposing circuit 130.

The output terminal 160 is an output (line out) terminal used for outputting the image signal output from the superimposing circuit 130 to an external apparatus, such as a television receiver.

The lens 170 collects externally input light and outputs the collected light to the CCD 180. The lens 170 changes an aperture in accordance with a control signal output from the microprocessor 110 so as to control the brightness of a captured image.

The CCD 180 is an image sensor that converts the light signal input through the lens 170 to an electrical signal. The CCD 180 then outputs the converted electrical signal to the camera signal processing circuit 190.

The camera signal processing circuit 190 performs appropriate signal processing on the electrical signal output from the CCD 180. Thereafter, the camera signal processing circuit 190 outputs the electrical signal subjected to the signal processing to the recording circuit 200 and the superimposing circuit 130 as a video signal. In addition, the camera signal processing circuit 190 applies a video effect to the video signal in accordance with a control signal output from the microprocessor 110.

The recording circuit 200 records the video signal output from the camera signal processing circuit 190 on a recording medium in accordance with a control signal output from the microprocessor 110.

The key input circuit 210 includes one or a plurality of external operating members. The key input circuit 210 outputs an input voltage in accordance with the operation of the external operating member to the microprocessor 110. Each of the external operating members is a hard key provided to the image pickup apparatus 100.

The power supply circuit 220 supplies electrical power to the microprocessor 110 and other circuits. The source of the electrical power is the battery 240 or the AC cable 250.

The power supply control circuit 230 controls on/off switching of power supply to the other circuits in accordance with a control signal output from the microprocessor 110.

The battery 240 supplies electrical power to the power supply circuit 220. The power supply circuit 220 charges the battery 240 using electrical power supplied via the AC cable 250.

The AC cable 250 is used for supplying electrical power to the power supply circuit 220.

The image pickup apparatus 100 has a plurality of shooting modes. The shooting mode determines a shooting condition when an image of a subject is captured. Examples of the shooting mode include a night scene and portrait mode used for capturing an image of a person in low-lit conditions.

Figure 2:
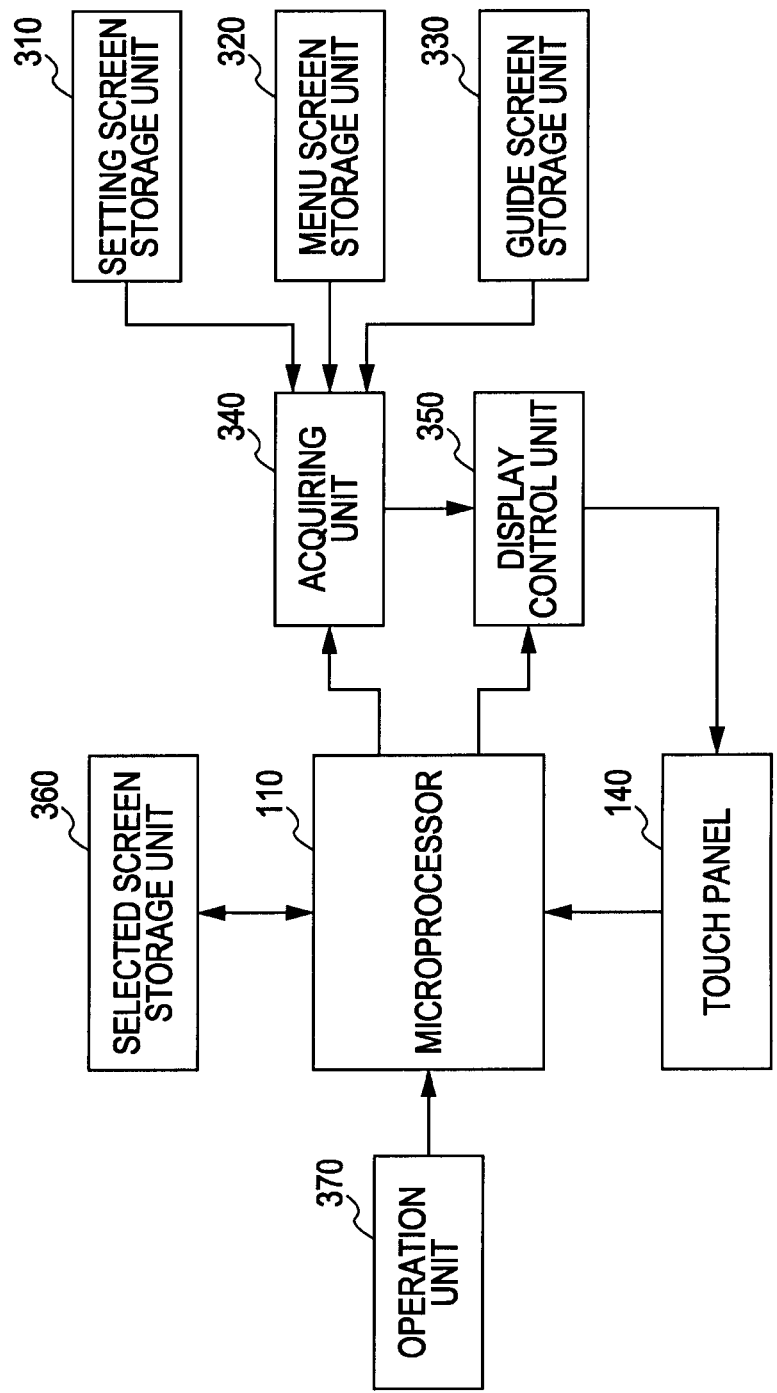
FIG. 2 is a block diagram of an example functional structure of display control of the image pickup apparatus according to the embodiment.

FIG. 2 is a block diagram of an example functional structure of display control of the image pickup apparatus 100 according to the present embodiment.

The image pickup apparatus 100 includes the microprocessor 110, the touch panel 140, a setting screen storage unit 310, a menu screen storage unit 320, a guide screen storage unit 330, an acquiring unit 340, a display control unit 350, a selected screen storage unit 360, and an operation unit 370.

The setting screen storage unit 310 stores setting screens used for setting a variety of functions. For example, the setting screen storage unit 310 stores a setting screen 420 shown in FIG. 7.

The menu screen storage unit 320 stores menu screens. Examples of the menu screen include a main menu item selection screen 410 shown in FIG. 5 and a menu list display screen 415 shown in FIG. 6. Menu screens are sequentially displayed in accordance with a selected button on the touch panel 140 so that the setting screen 420 is eventually displayed on the touch panel 140.

The guide screen storage unit 330 stores guide screens. Examples of the guide screen include a guide main menu item selection screen 500 shown in FIG. 8, a guide submenu item selection screen 510 shown in FIG. 9, and a guide description screen 520 shown in FIG. 10. The guide screen displays at least a button or a help message that describes the purpose of the operation or the effect of the operation. The guide screens are sequentially displayed on the touch panel 140 in accordance with a selected button displayed on the touch panel 140 so that the setting screen 420 is finally displayed through an operation path different from that of the menu screens, which are stored in the menu screen storage unit 320.

In response to an instruction from the microprocessor 110, the acquiring unit 340 accesses the setting screen storage unit 310, the menu screen storage unit 320, or the guide screen storage unit 330 so as to acquire a variety of screens stored in these storage units.

In response to an instruction from the microprocessor 110, the display control unit 350 displays, on the touch panel 140, a screen acquired from the setting screen storage unit 310, the menu screen storage unit 320, or the guide screen storage unit 330 by the acquiring unit 340.

When a set button 523 in the guide description screen 520 or the operating member specified in external-operating-member instruction text 528 in the guide description screen 520 is pressed, the selected screen storage unit 360 stores the guide help screen displayed at that time. That is, when the setting screen 420 is displayed on the touch panel 140 after the user is guided through the guide screens, the selected screen storage unit 360 stores the guide screen displayed immediately preceding the setting screen 420. By storing a guide help screen displayed when the set button 523 or the specified external operating member is pressed, the image pickup apparatus 100 can rapidly display the guide help screen most recently used by the user when the user uses the function next time.

The operation unit 370 includes one or a plurality of external operating members and outputs an input voltage in accordance with the operation of the external operating member to the microprocessor 110.

The microprocessor 110 controls the acquiring unit 340 and the display control unit 350 in accordance with a selected button on the touch panel 140 and an operated external operating member of the operation unit 370.

Figure 3:
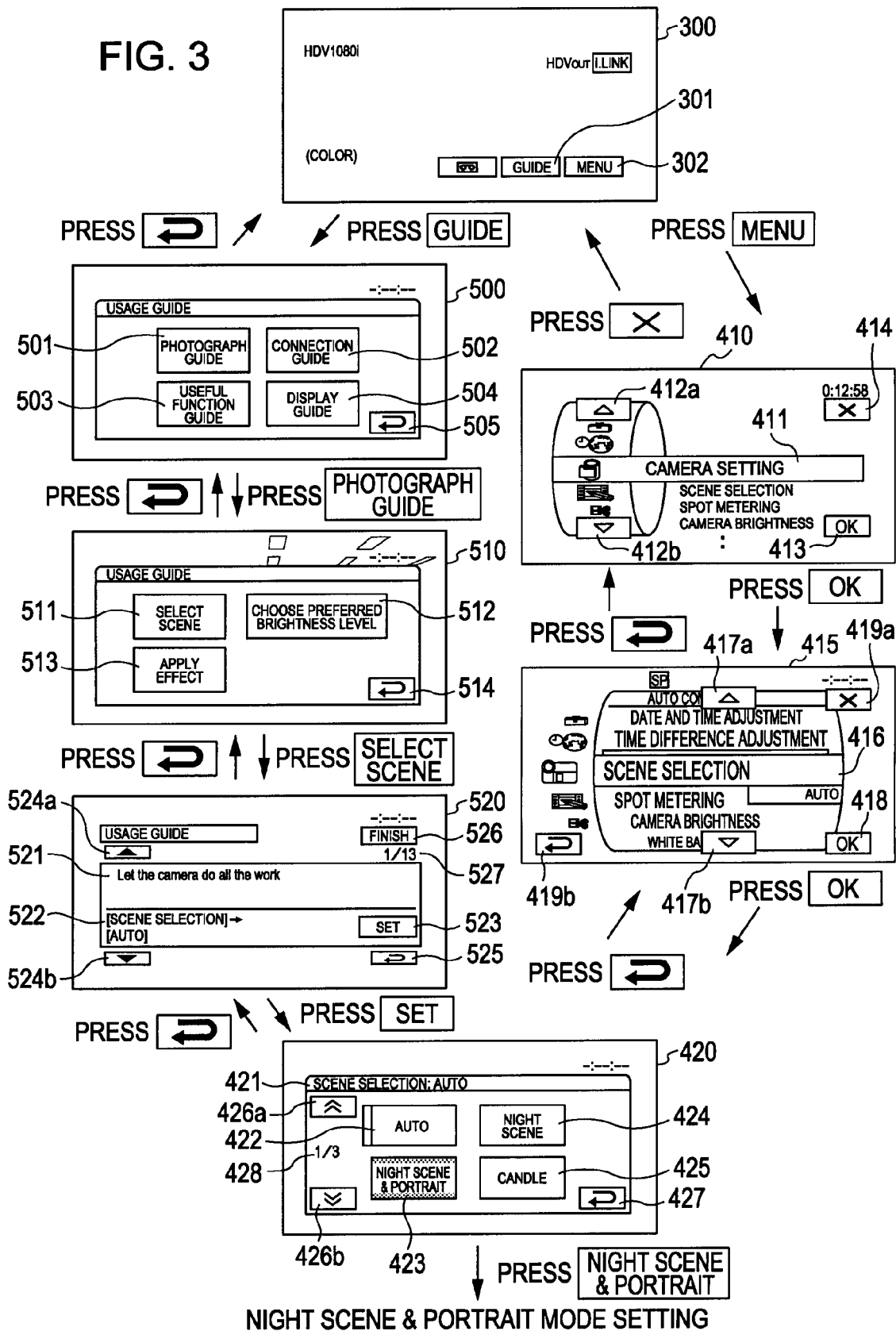
FIG. 3 illustrates an example of transition of a display screen displayed on a touch panel.

FIG. 3 illustrates an example of transition of the display screen displayed on the touch panel 140.

FIGS. 4 to 21 illustrate examples of the display screens displayed on the touch panel 140.

A display screen 300 shown in FIG. 3 is an initial screen displayed on the touch panel 140 when the image pickup apparatus 100 is started (e.g., the image pickup apparatus 100 is powered on). The display screen 300 serves as a start screen for setting a variety of functions provided to the image pickup apparatus 100 or changing the settings.

Figure 4:
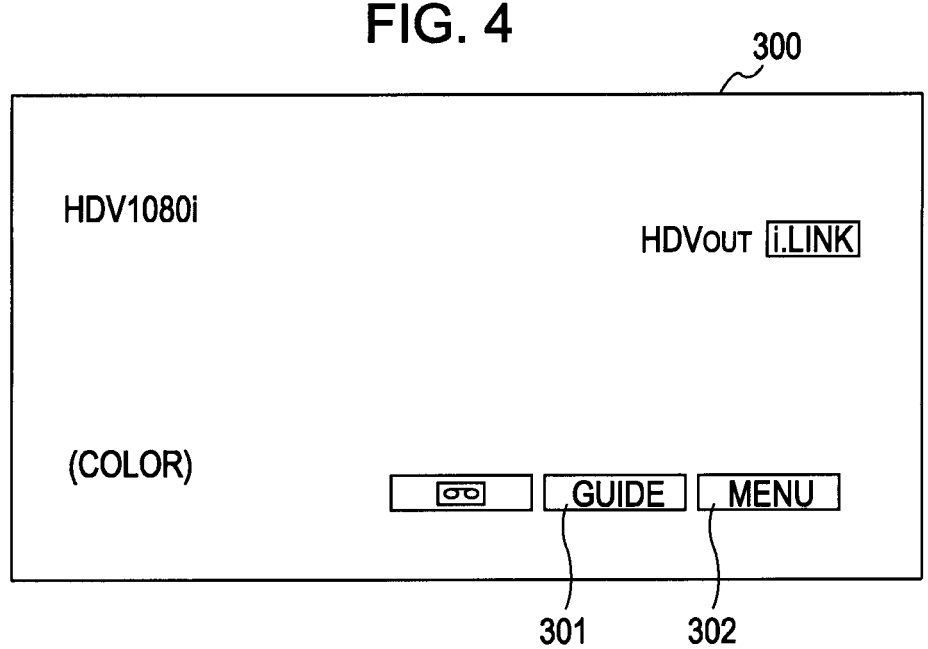
FIG. 4 illustrates an example of transition of a display screen displayed on the touch panel.

A guide button 301 and a menu button 302 are displayed in the display screen 300. FIG. 4 is an enlarged view of the display screen 300. The display screen 300 is always displayed when the image pickup apparatus 100 is powered on. An image to be captured or a playback image can be displayed in the display screen 300 in addition to the guide button 301 and the menu button 302.

The guide button 301 is a selection button serving as a start point to an operation guide function that helps users who are unfamiliar with setting a function of the image pickup apparatus 100. The menu button 302 is a selection button serving as a start point to an operation guide function that helps users who are familiar with the functions of the image pickup apparatus 100. Note that the menu button 302 is used in existing image pickup apparatuses.

Almost all users of the image pickup apparatus 100 see the display screen 300 that is displayed on the touch panel 140 when the image pickup apparatus 100 is powered on. Therefore, by providing two starting points for bringing the users to the setting of each of the functions (i.e., the guide button 301 and the menu button 302) on the initial screen of the touch panel 140, even users who do not know the presence of the guide function, which helps the users operate the image pickup apparatus 100, can intuitively know the presence of the guide function.

When the display screen 300 is displayed on the touch panel 140 and the user wants to set a desired function, the user presses one of the guide button 301 and the menu button 302 to display the setting screen of the desired function.

An existing method for setting a night scene and portrait mode is described next with reference to FIG. 3. The night scene and portrait mode is one of the shooting modes that can be set using the touch panel 140.

Figure 5:
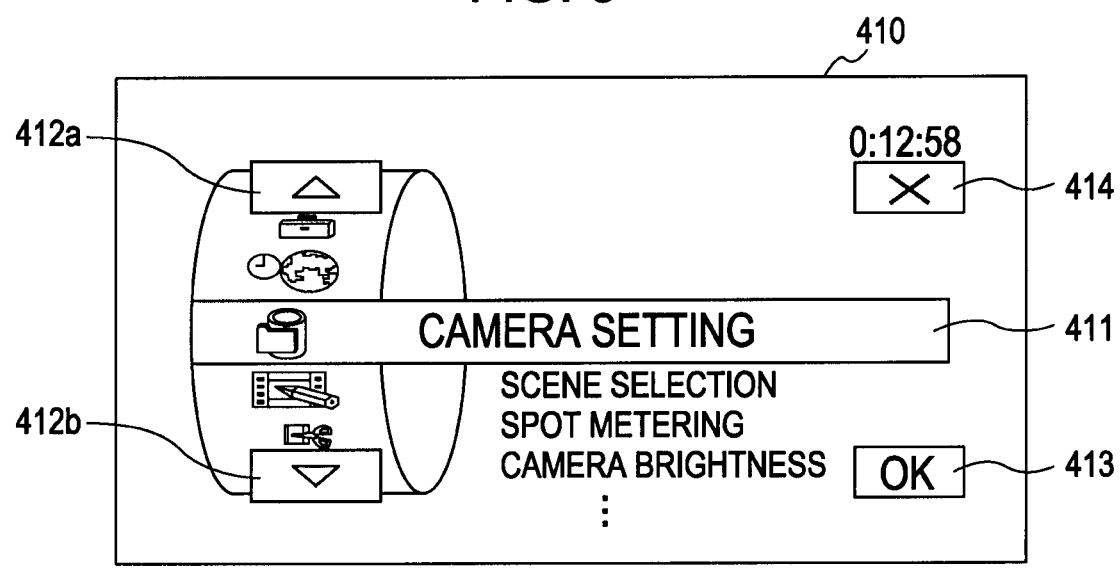
FIG. 5 illustrates an example of transition of a display screen displayed on the touch panel.

When the menu button 302 in the display screen 300 is pressed, the main menu item selection screen 410 is displayed on the touch panel 140. FIG. 5 is an enlarged view of the main menu item selection screen 410.

A variety of functions provided by the image pickup apparatus 100 are categorized, and the categorized items are displayed in the main menu item selection screen 410. The user selects one of the categorized items including the desired function.

A menu item display 411, a scroll up button 412a, a scroll down button 412b, an OK button 413, and an "X" button 414 are displayed in the main menu item selection screen 410. The menu item display 411 shows one of the main menu items including a variety of functions. For example, the text "CAMERA SETTING" is displayed in the menu item display 411 as a main menu item. In addition, the submenus "SCENE SELECTION", "SPOT METERING", "CAMERA BRIGHTNESS", etc. included in the main menu item "CAMERA SETTING" are displayed in the menu item display 411.

The scroll up button 412a and the scroll down button 412b are used for scrolling the items to change the item displayed in the menu item display 411 on the touch panel 140 to another item. The OK button 413 is pressed in order to display a setting screen of one of the function items that is included in the category displayed in the menu item display 411. The "X" button 414 is pressed in order to change the main menu item selection screen 410 currently displayed on the touch panel 140 to the display screen 300.

The length of the name of a main category displayed in the main menu item selection screen 410 is limited so that a large number of menus can be displayed in the touch panel 140. Accordingly, the user can easily search for a desired function menu.

As described above, since the list of the names of categories are displayed in the main menu item selection screen 410, this method is friendly for users who have carefully read a manual and have understood the names of functions or who are familiar with the operation of the image pickup apparatus 100. In contrast, in this method, users who are unfamiliar with the operation of the image pickup apparatus 100 or who are novice users may not easily understand the functions when looking at the main menu items displayed in the main menu item selection screen 410, and therefore, they may have difficulty setting a desired function.

Figure 6:
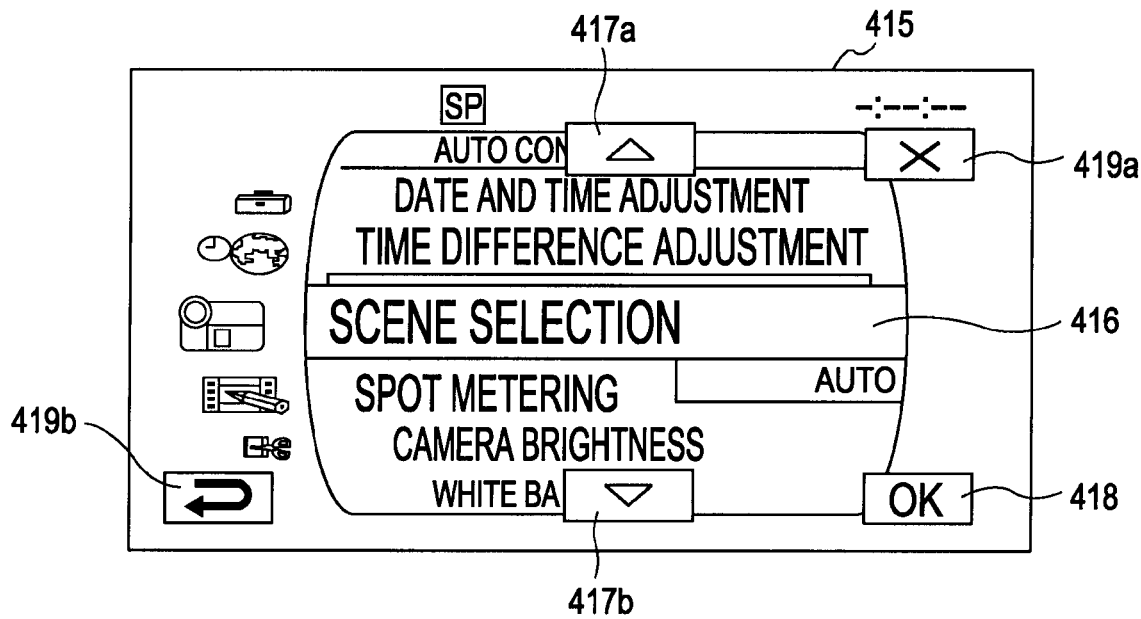
FIG. 6 illustrates an example of transition of a display screen displayed on the touch panel.

For example, when a category "CAMERA SETTING" is displayed in the menu item display 411 of the main menu item selection screen 410 and the OK button 413 is pressed, a menu list display screen 415 is displayed on the touch panel 140. Here, the menu list display screen 415 is a start screen from which the user will navigate to the setting screen 420 used for setting a variety of functions in the "CAMERA SETTING" category. FIG. 6 is an enlarged view of the menu list display screen 415. However, when the "X" button 414 in the main menu item selection screen 410 is pressed, the display screen 300 is displayed on the touch panel 140.

As noted above, the menu list display screen 415 is a start screen from which the user will navigate to the setting screen 420 used for setting a variety of functions of the image pickup apparatus 100.

The menu list display screen 415 includes a menu item display 416, a scroll up button 417a, a scroll down button 417b, an OK button 418, an "X" button 419a, and a return button 419b. The menu item display 416 is a region in which the names of submenus of the functions are displayed. Examples of the submenu include "SCENE SELECTION", "SPOT METERING", and "CAMERA BRIGHTNESS".

The scroll up button 417a and the scroll down button 417b are used for scrolling the submenu displayed in the menu item display 416 on the touch panel 140 to a different one. The OK button 418 is pressed in order to display a setting screen of one of the function items of the submenu displayed in the menu item display 416 on the touch panel 140. The "X" button 419a is pressed in order to change the menu list display screen 415 displayed on the touch panel 140 to the display screen 300. The return button 419b is pressed in order to change the menu list display screen 415 displayed on the touch panel 140 to the main menu item selection screen 410.

The length of the name of a sub-category displayed in the menu list display screen 415 is limited so that a large number of menu items can be displayed in the touch panel 140. Accordingly, the user can easily search for a desired function.

As described above, since the list of the names of sub-categories of the functions are displayed in the menu list display screen 415, this method is friendly for users who have carefully read a manual and have understood the names of functions or who are familiar with the operation of the image pickup apparatus 100. In contrast, in this method, users who are unfamiliar with the operation of the image pickup apparatus 100 or who are novice users may not easily understand the functions when looking at the submenu items displayed in the menu list display screen 415, and therefore, they may have difficulty setting a desired function.

Figure 7:
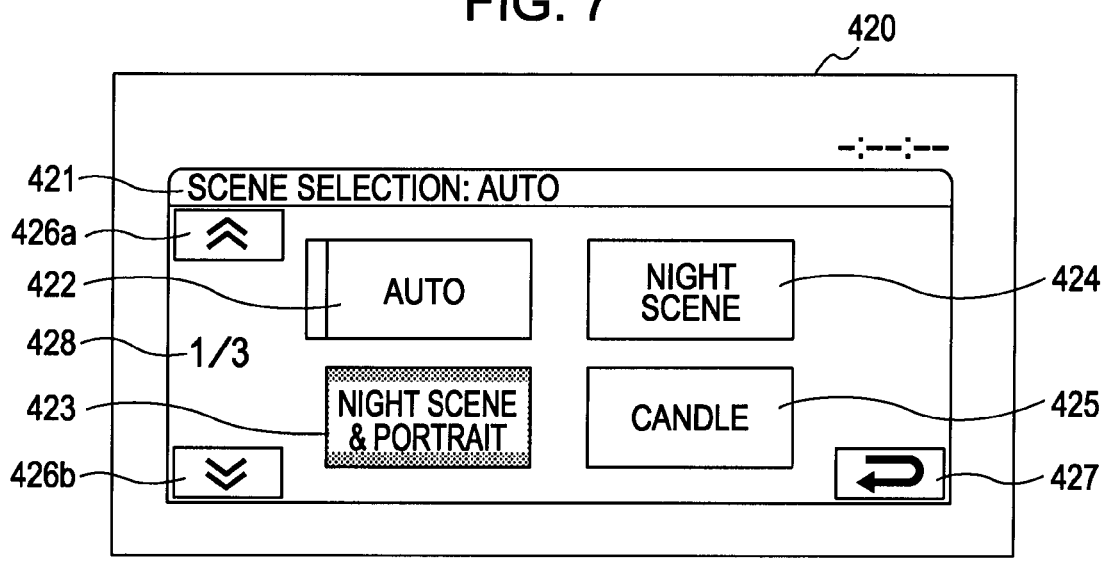
FIG. 7 illustrates an example of transition of a display screen displayed on the touch panel.

For example, when a sub-category "SCENE SELECTION" is displayed in the menu item display 416 of the menu list display screen 415 and the OK button 418 is pressed, the setting screen 420 of "SCENE SELECTION" is displayed on the touch panel 140. FIG. 7 is an enlarged view of the setting screen 420. However, when the return button 419b in the menu list display screen 415 is pressed, the main menu item selection screen 410 is displayed on the touch panel 140.

The setting screen 420 is used for setting, changing, or adjusting each of the functions of the image pickup apparatus 100. Using the setting screen 420, a predetermined function is set through the corresponding predetermined operation.

For example, a setting item display 421, selection buttons 422 to 425, a scroll up button 426a, a scroll down button 426b, a return button 427, and a page number 428 are displayed in the setting screen 420 of the scene selection.

The setting item display 421 displays the submenus of the setting items displayed on the touch panel 140. For example, the text "SCENE SELECTION" is displayed as a submenu. The selection buttons 422 to 425 are used for selecting a function to be set in the setting screen 420. For example, the selection buttons 422 to 425 serve as an auto button, a night scene & portrait button, a night scene button, and a candle button, respectively.

The scroll up button 426a and the scroll down button 426b are used for scrolling the setting screen 420 displayed on the touch panel 140 to a different setting screen. The return button 427 is pressed in order to change the setting screen 420 displayed on the touch panel 140 to the menu list display screen 415.

The page number 428 represents the page number of the setting screen currently displayed on the touch panel 140 among all of the setting screens. More specifically, in the setting screen 420 shown in FIGS. 3 and 7, the text "1/3" is displayed as the page number 428 on the touch panel 140. This text indicates that the currently displayed screen is a first page of the three-page setting screens 420.

For example, when the night scene & portrait button 423 in the setting screen 420 is pressed, a night scene & portrait mode is set for the image pickup apparatus 100.

The setting of a night scene & portrait mode using a guide function is described next with reference to FIG. 3 and other drawings.

Figure 8:
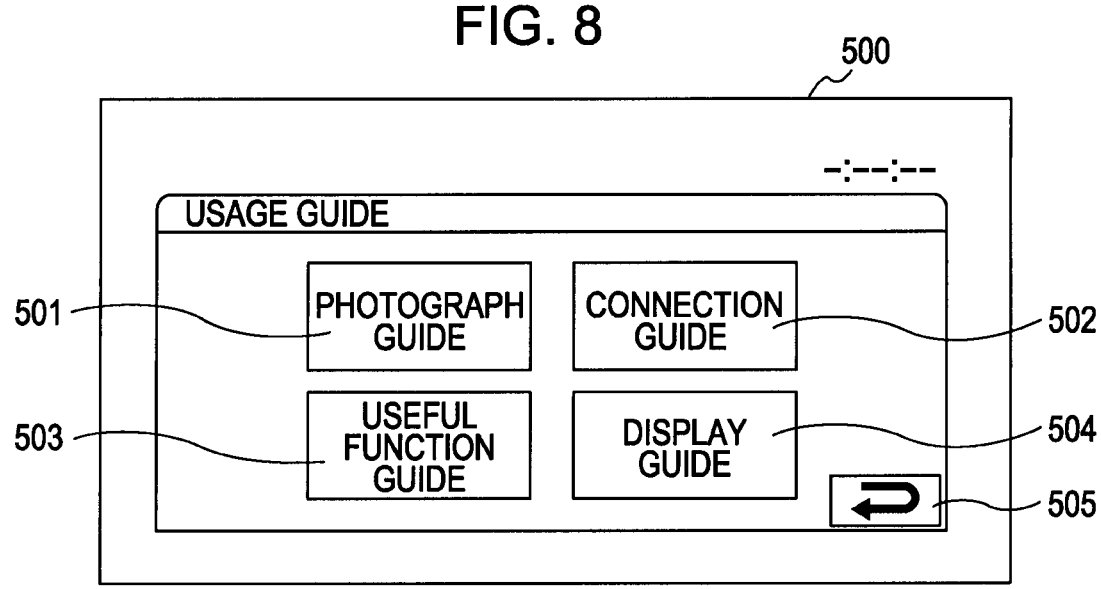
FIG. 8 illustrates an example of transition of a display screen displayed on the touch panel.

When the guide button 301 in the display screen 300 is pressed, the guide main menu item selection screen 500 is displayed on the touch panel 140. FIG. 8 is an enlarged view of the guide main menu item selection screen 500.

The guide main menu item selection screen 500 is a start screen from which the user will navigate to the setting screens for setting each of the functions of the image pickup apparatus 100. That is, the user reaches a setting screen of a desired function starting from the main menu item selection screen 410 by sequentially selecting desired functions. However, in the guide main menu item selection screen 500, the user can reach a screen of a desired function by sequentially selecting screens in accordance with the purpose of the operation, the effect of the operation, and a photographing environment.

The guide main menu item selection screen 500 includes a photograph guide button 501, a connection guide button 502, a useful function guide button 503, a display guide button 504, and a return button 505 displayed therein.

Figure 9:
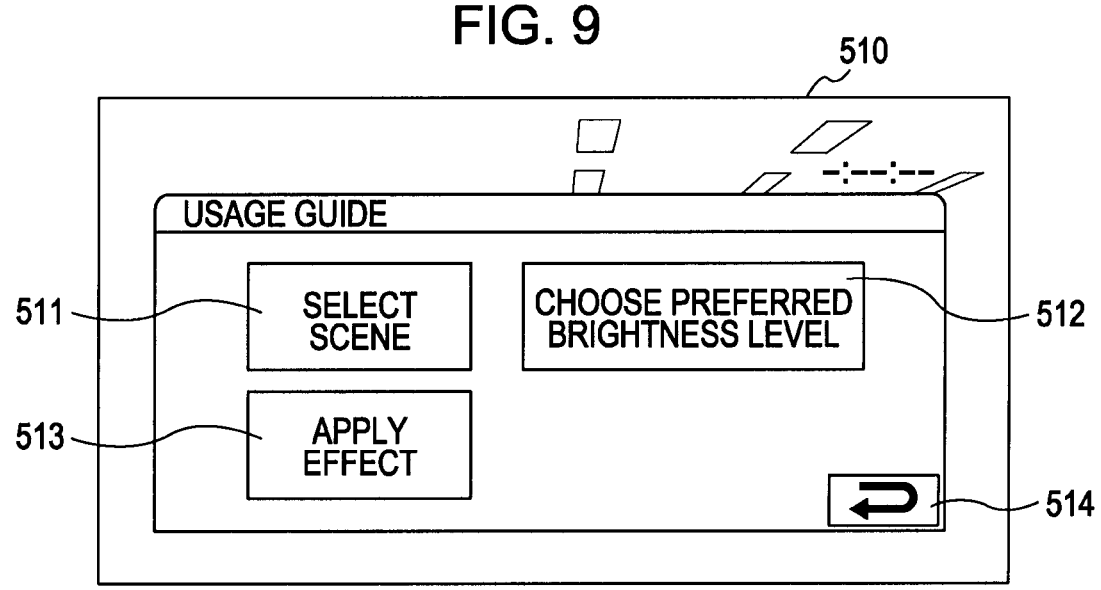
FIG. 9 illustrates an example of transition of a display screen displayed on the touch panel.

The photograph guide button 501 is pressed in order to advance the screen to the setting screen on the basis of the purpose of the operation. When the photograph guide button 501 is pressed, the screen shown in FIG. 9 is displayed on the touch panel 140, for example.

The connection guide button 502 is pressed in order to establish connection between the image pickup apparatus 100 and an external apparatus, such as a television receiver. At that time, the user answers to questions that the image pickup apparatus 100 sequentially provides so as to perform settings sequentially.

The useful function guide button 503 is pressed in order to set a useful function that can be relatively easily used. When the useful function guide button 503 is pressed, the screen shown in FIG. 16 or 17 is displayed on the touch panel 140, for example.

Figure 18:
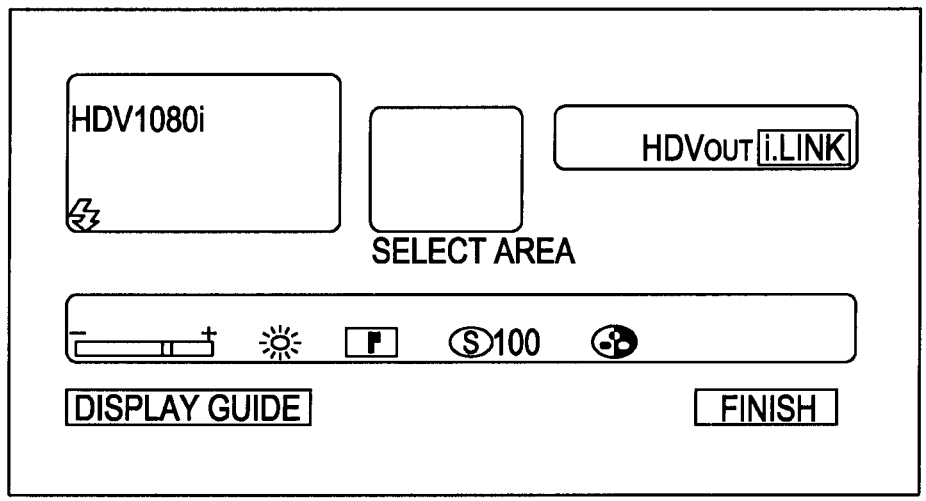
FIG. 18 illustrates an example of transition of a display screen displayed on the touch panel.
Figure 19:
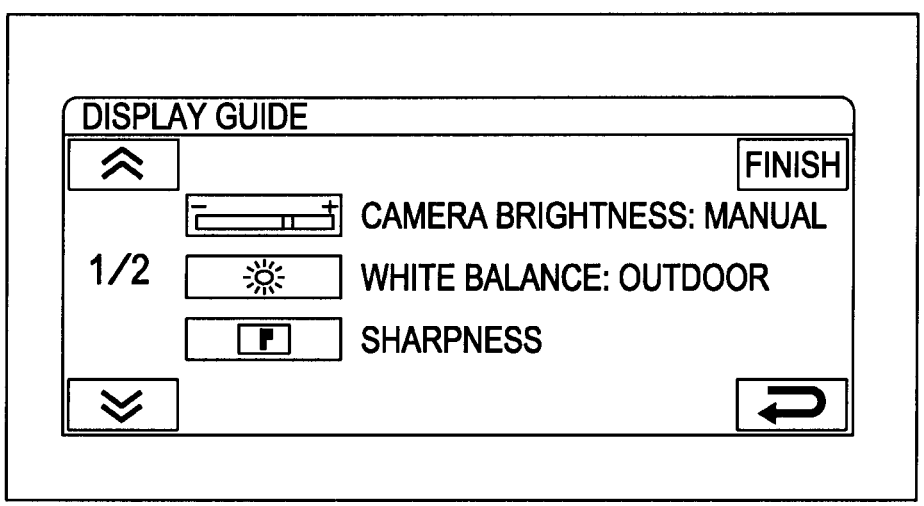
FIG. 19 illustrates an example of transition of a display screen displayed on the touch panel.
Figure 20:
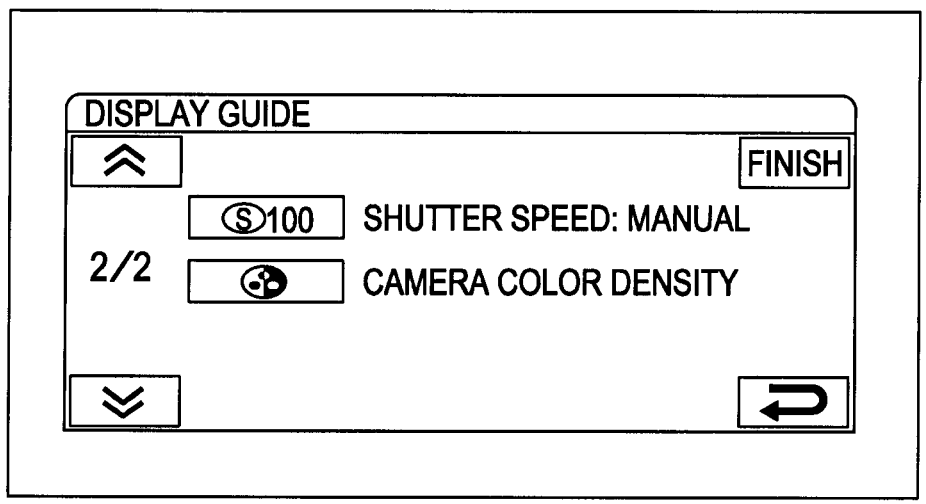
FIG. 20 illustrates an example of transition of a display screen displayed on the touch panel.
Figure 21:
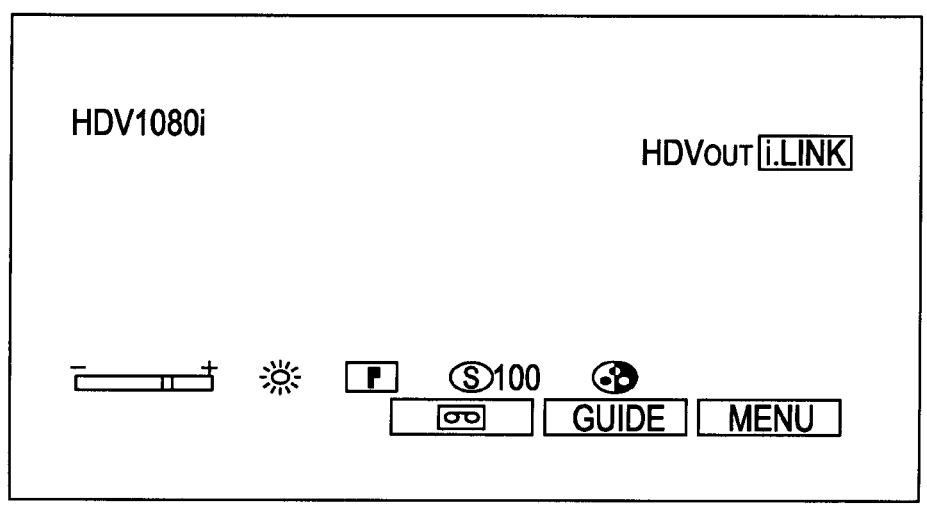
FIG. 21 illustrates an example of transition of a display screen displayed on the touch panel.

The display guide button 504 is pressed in order to display a description of the letter or symbol displayed on the touch panel 140. While a function of the image pickup apparatus 100 is set, the letter or symbol that represents the function currently set is displayed on the touch panel 140. When the display guide button 504 is pressed, the screen shown in FIG. 18 or 21 is displayed on the touch panel 140, for example.

The return button 505 is pressed in order to change the guide main menu item selection screen 500 displayed on the touch panel 140 to the display screen 300.

Here, the case where the photograph guide button 501 is pressed to display the setting screen is described.

For example, when the photograph guide button 501 in the guide main menu item selection screen 500 is pressed, the guide submenu item selection screen 510 is displayed on the touch panel 140. FIG. 9 is an enlarged view of the guide submenu item selection screen 510. In contrast, when the return button 505 in the guide main menu item selection screen 500 is pressed, the display screen 300 is displayed on the touch panel 140.

The guide submenu item selection screen 510 is a start screen from which the user will navigate to the setting screens for setting each of the functions of the image pickup apparatus 100 in accordance with the purpose of the operation, the effect of the operation, and a photographing environment.

The guide submenu item selection screen 510 includes a "Select scene" button 511, a "Choose preferred brightness level" button 512, an "Apply effect" button 513, and a return button 514 displayed therein.

Figure 10:
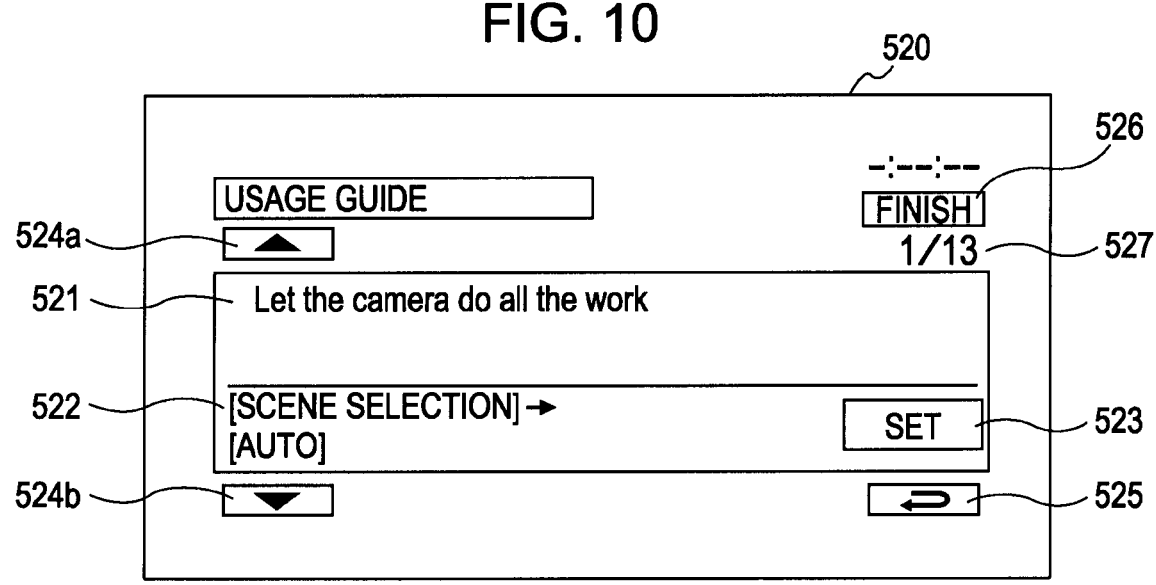
FIG. 10 illustrates an example of transition of a display screen displayed on the touch panel.
Figure 11:
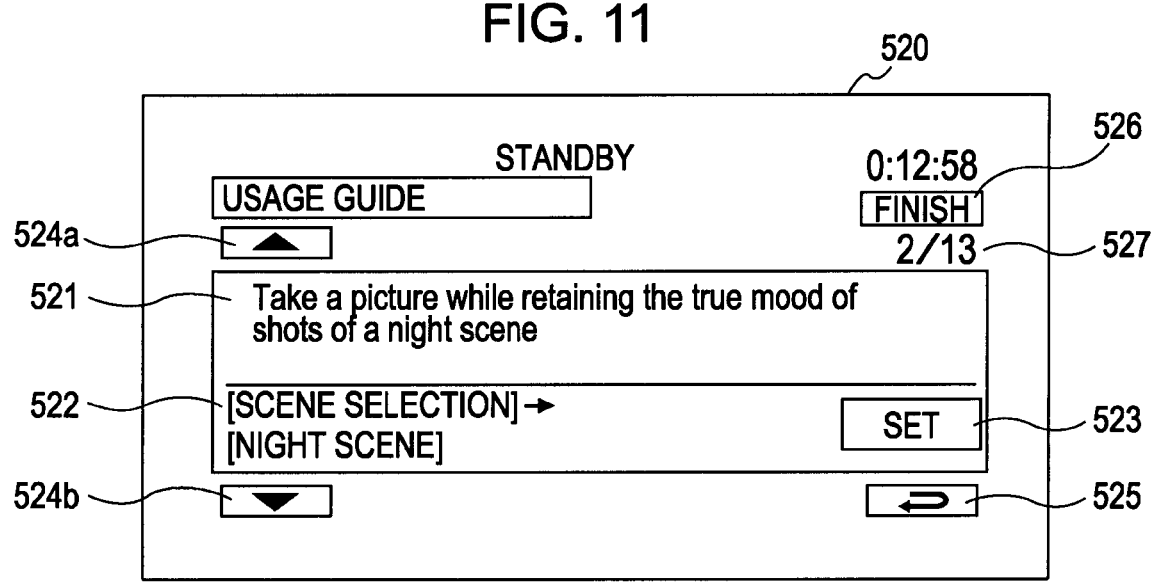
FIG. 11 illustrates an example of transition of a display screen displayed on the touch panel.
Figure 12:
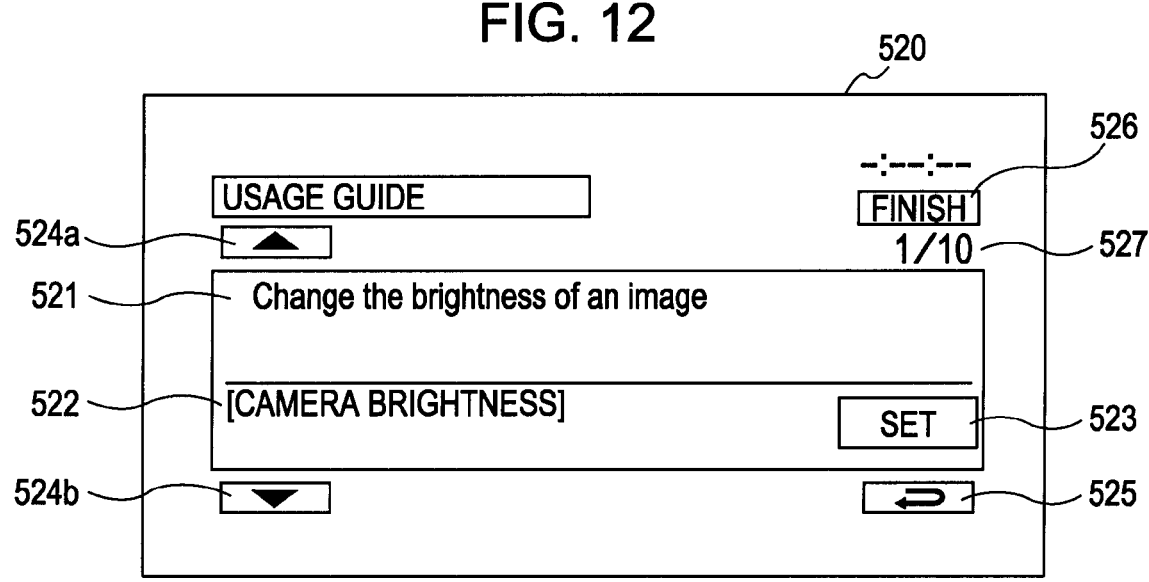
FIG. 12 illustrates an example of transition of a display screen displayed on the touch panel.

The "Select scene" button 511 is pressed in order to set a shooting mode in accordance with a photographing environment. For example, when the "Select scene" button 511 is pressed, a guide description screen "Let the camera do all the work" shown in FIG. 10 or a guide description screen "Take a picture while retaining the true mood of shots of a night scene" shown in FIG. 11 is displayed on the touch panel 140.

Figure 13:
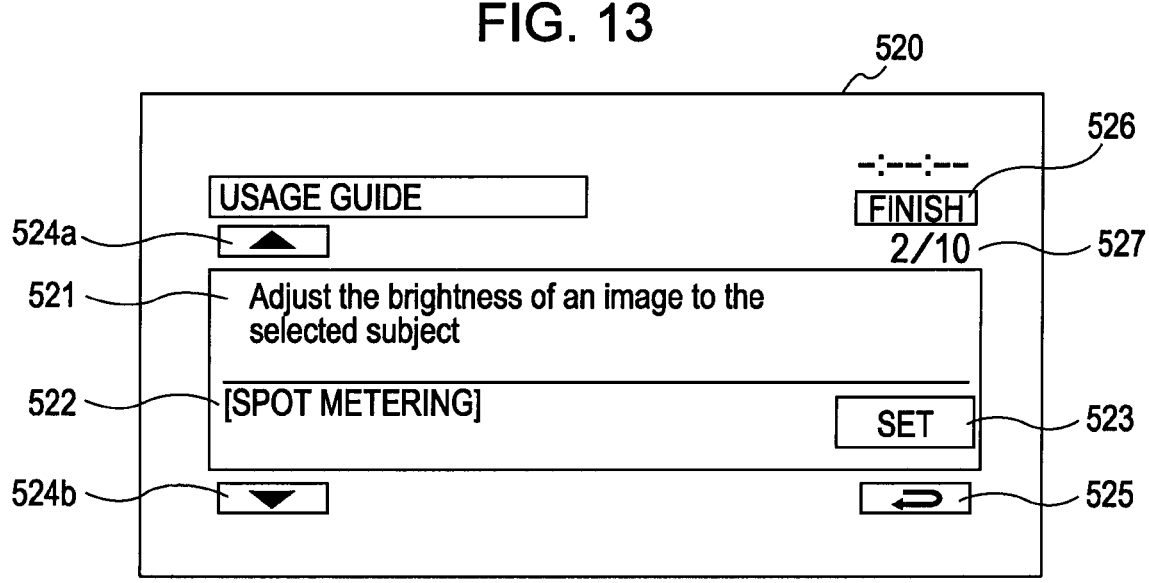
FIG. 13 illustrates an example of transition of a display screen displayed on the touch panel.
Figure 14:
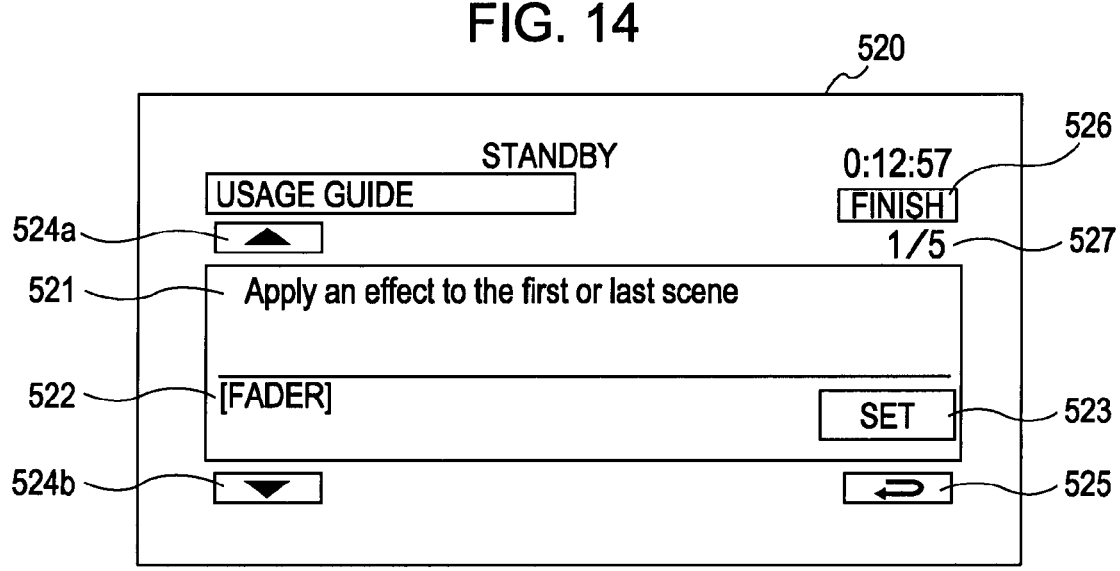
FIG. 14 illustrates an example of transition of a display screen displayed on the touch panel.

The "Choose preferred brightness level" button 512 is pressed in order to set a shooting mode in accordance with the purpose of the user. For example, when the "Choose preferred brightness level" button 512 is pressed, a guide description screen "Change the brightness of an image" shown in FIG. 12 or a guide description screen "Adjust the brightness of an image to the selected subject" shown in FIG. 13 is displayed on the touch panel 140.

Figure 15:
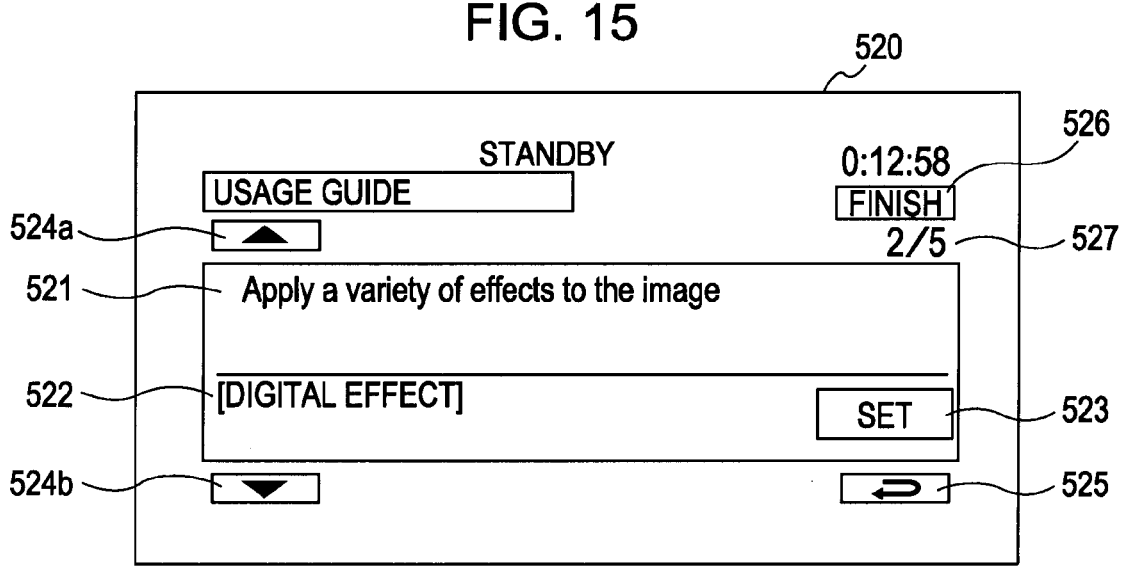
FIG. 15 illustrates an example of transition of a display screen displayed on the touch panel.

The "Apply effect" button 513 is pressed in order to set the shooting mode in accordance with the effect of each of the functions. For example, when the "Apply effect" button 513 is pressed, the guide description screen "Apply an effect to the first or last scene" shown in FIG. 14 or the guide description screen "Apply a variety of effects to the image" shown in FIG. 15 is displayed on the touch panel 140.

The return button 514 is used in order to change the display of the touch panel 140 from the guide submenu item selection screen 510 to the guide main menu item selection screen 500.

For example, when the "Select scene" button 511 in the guide submenu item selection screen 510 is pressed, the guide description screen 520 is displayed on the touch panel 140. FIG. 10 is an enlarged view of the guide description screen 520. In contrast, when the return button 514 in the guide submenu item selection screen 510 is pressed, the guide main menu item selection screen 500 is displayed on the touch panel 140.

The guide description screen 520 is a start screen from which the user will navigate to a setting screen of each function of the image pickup apparatus 100.

The guide description screen 520 includes a description display 521, a setting item display 522, a set button 523, a scroll up button 524a, a scroll down button 524b, a return button 525, a finish button 526, and a page number 527.

The description display 521 displays a detailed description of the shooting conditions. For example, the text "Let the camera do all the work" is displayed. The setting item display 522 displays the setting items corresponding to the action displayed in the description display 521.

The set button 523 is pressed in order to set the setting item displayed in the description display 521 and the setting item display 522.

The scroll up button 524a and the scroll down button 424b are used for scrolling the guide description screen 520 displayed on the touch panel 140 to a different guide description screen. The return button 525 is pressed in order to change the guide description screen 520 displayed on the touch panel 140 to the guide submenu item selection screen 510. The finish button 526 is pressed in order to finish the guide function. When the finish button 526 is pressed, the guide description screen 520 displayed on the touch panel 140 is changed to the display screen 300.

The page number 527 represents the page number of the guide description screen currently displayed on the touch panel 140 among all of the guide description screens. More specifically, in the guide description screen 520 shown in FIG. 3, the text "1/13" is displayed as the page number 527. This text indicates that the currently displayed guide description screen 520 is a first page of the thirteen-page guide description screen.

For example, as shown in FIGS. 3 and 13, when the text "Let the camera do all the work" is displayed in the description display 521 of the guide description screen 520 and the set button 523 is pressed, the above-described setting screen 420 is displayed on the touch panel 140. The operation of the setting screen 420 is the same as described above.

When the set button 523 in the guide description screen 520 is pressed, the currently displayed guide description screen 520 is stored in the selected screen storage unit 360. By storing the guide description screen displayed when the set button 523 is pressed, the image pickup apparatus 100 can promptly display the guide description screen used by the user when the user uses the image pickup apparatus 100 next time. Since the possibility of the user selecting the same function for the next time usage is high, the user can immediately perform the setting operation. In addition, when the user cancels the setting, the user needs to operate through the screen that is the same as that used for the setting. In such a case, the image pickup apparatus 100 can promptly display the guide description screen that was used by the user when the user performed the setting. Accordingly, even when the user cancels the setting, the user can immediately perform the setting cancel operation.

As described above, when the night scene & portrait button 423 in the setting screen 420 for scene selection is pressed, a night scene & portrait mode is set for the image pickup apparatus 100. When the return button 427 in the setting screen 420 is pressed, the setting screen 420 displayed on the touch panel 140 is changed to the guide description screen 520. Alternatively, in order to let the user understand the normal setting procedure, the setting screen 420 displayed on the touch panel 140 may be changed to the menu list display screen 415 when the return button 427 in the setting screen 420 is pressed.

In this way, the user navigates to the setting screen while viewing the purpose of the operation, the effect of the operation, and the like. Accordingly, even a user who is unfamiliar with the operation of the image pickup apparatus 100, who has not carefully read the operation manual of the image pickup apparatus 100, or who uses the image pickup apparatus 100 for the first time can easily set a desired function of the image pickup apparatus 100.

While the foregoing setting method of a variety of functions has been described with reference to the use of the touch panel 140, the image pickup apparatus 100 can have a function set only by the use of an external operation member. Hereinafter, such a function is referred to as an "external operation member setting function". Accordingly, a method for setting an external operation member setting function is described next.

In an existing method, in general, the user needs to read an operation manual and find the external operation member mounted on the image pickup apparatus 100. Subsequently, the user operates the external operation member to set the function.

However, a user who is unfamiliar with the operation of the image pickup apparatus 100 and has not carefully read the manual of the image pickup apparatus 100 may want to use the external operation member. Even in such a case, the following method allows the user to relatively easily set the function. The user need not know beforehand whether the desired function is an external operation member setting function or a function that can be set through the touch panel 140.

Figure 22:
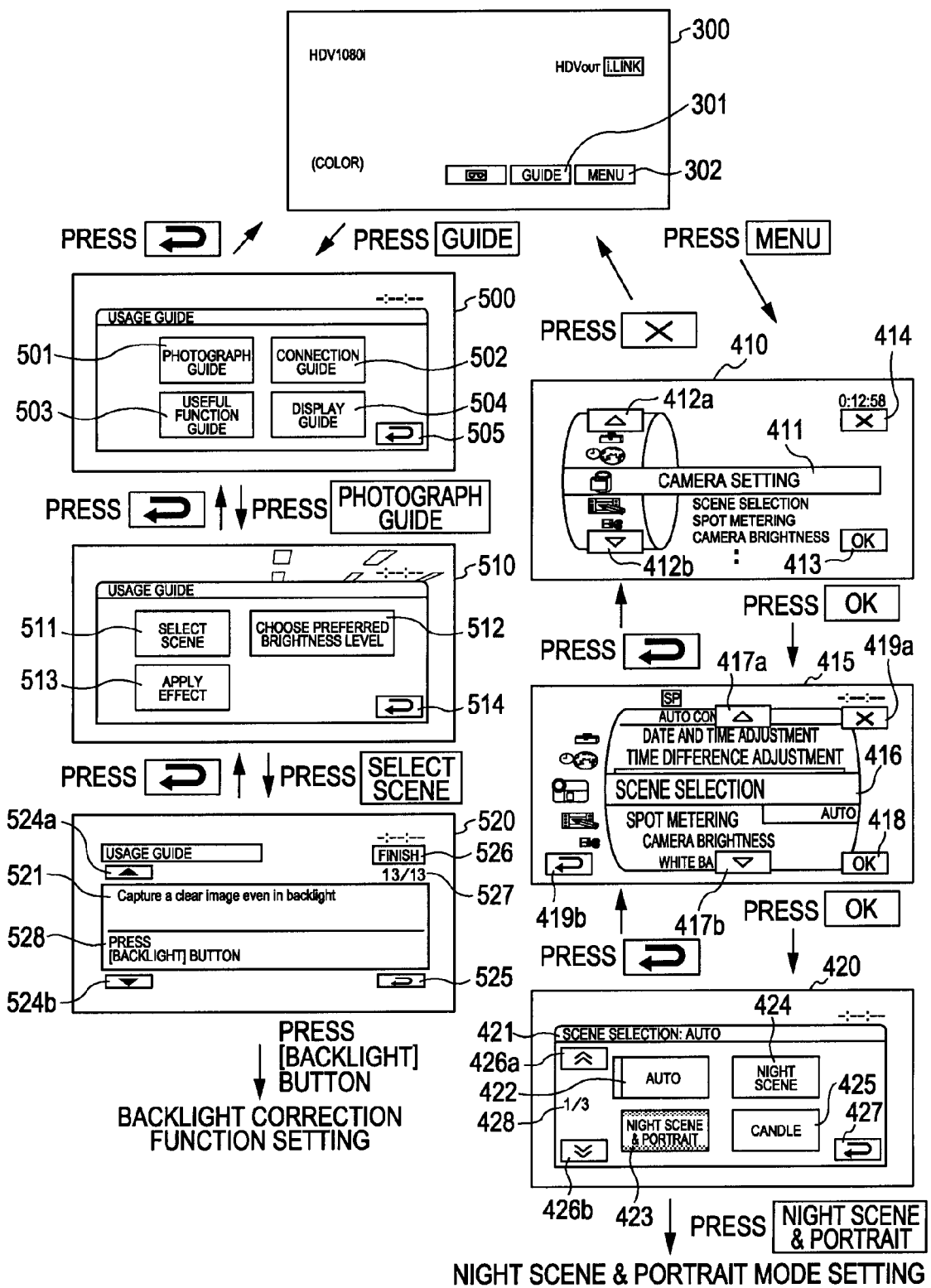
FIG. 22 illustrates an example of transition of a display screen displayed on the touch panel.

FIG. 22 illustrates an example of the transition of a display screen displayed on the touch panel 140.

In this example, in order to capture a clear image even in backlight conditions, an operation in which a user presses a backlight button (not shown) to set a backlight correction function using a guide function is described next with reference to FIG. 22.

As described above, when the display screen 300 is displayed on the touch panel 140, the user sequentially presses the guide button 301 and the like so as to display the guide description screen 520.

As shown in FIG. 22, an external-operation-member use instruction 528 is displayed in the guide description screen 520 used for setting the external operation member setting function, in place of displaying the set button 523.

The external-operation-member use instruction 528 is a display region for indicating the external operation member to be operated in order to set a function corresponding to the information displayed in the description display 521.

In the guide description screen 520 shown in FIG. 22, the description display 521, the scroll up button 524a, the scroll down button 524b, the return button 525, the finish button 526, and the page number 527 are similar to those described in the guide description screen 520 shown in FIG. 3.

For example, as shown in FIG. 22, in the case where the text "Capture a clear image even in backlight" is displayed in the description display 521 of the guide description screen 520, when the backlight button (i.e., the external operation member mounted on the casing of the image pickup apparatus 100) indicated in the external-operation-member use instruction 528 is pressed, the backlight correction function of the image pickup apparatus 100 is set.

In addition, when the external operation member indicated in the external-operation-member use instruction 528 of the guide description screen 520 is pressed, the guide description screen displayed at that time is stored in the selected screen storage unit 360. By storing the guide description screen displayed when the external operation member is pressed, the image pickup apparatus 100 can promptly display the guide description screen used by the user when the user uses the image pickup apparatus 100 next time. Since the possibility of the user selecting the same function for the next time usage is high, the user can immediately perform the setting operation.

The operation of the image pickup apparatus 100 according to the present embodiment is described next with reference to the accompanying drawings.

Figure 23:
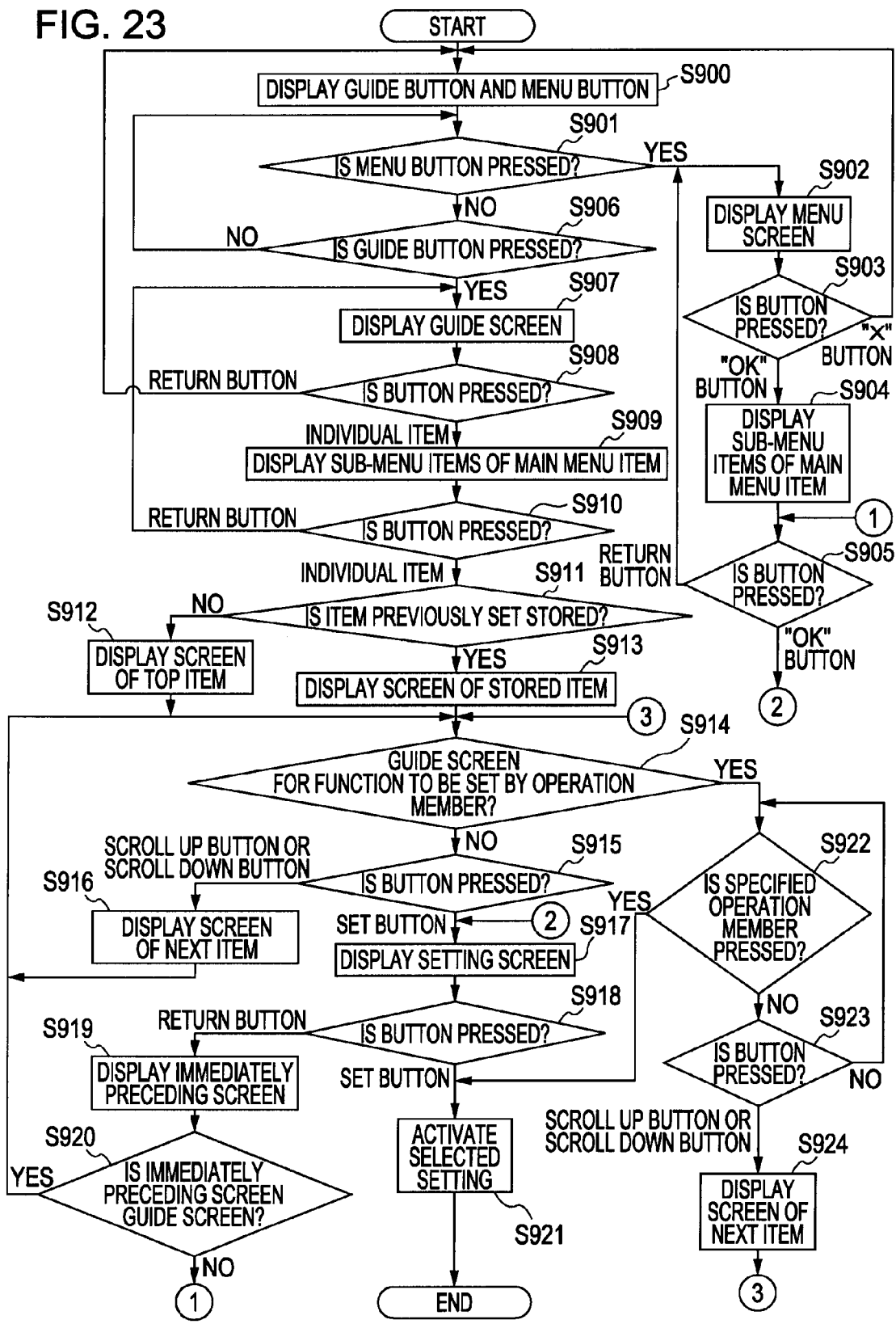
FIG. 23 is a flow chart illustrating the setting procedure of each of the functions of the image pickup apparatus.

FIG. 23 is a flow chart illustrating the setting procedure of each of the functions of the image pickup apparatus 100.

When the image pickup apparatus 100 is powered on or the display of the initial screen is instructed, the display screen 300 is displayed on the touch panel 140, as shown in FIGS. 3 and 4. The display screen 300 includes the guide button 301 and the menu button 302 displayed therein (step S900).

Thereafter, it is determined whether a user presses the menu button 302 in the display screen 300 (step S901). If the menu button 302 in the display screen 300 is pressed (step S901), the main menu item selection screen 410 is displayed on the touch panel 140, as shown in FIGS. 3 and 5 (step S902).

Subsequently, it is determined whether the user has pressed the OK button 413 or the "X" button 414 in the main menu item selection screen 410 (step S903). If the OK button 413 in the main menu item selection screen 410 has been pressed (step S903), the screen corresponding to the main menu item displayed in the menu item display 411 when the OK button 413 was pressed is displayed, as shown in FIGS. 3 and 6 (step S904). For example, when the text "CAMERA SETTING" is displayed in the menu item display 411 and the OK button 413 is pressed, the menu list display screen 415 corresponding to "CAMERA SETTING" is displayed on the touch panel 140 (step S904). However, if the "X" button 414 is pressed (step S903), the display screen 300 is displayed on the touch panel 140 (step S900). When the scroll up button 412a or the scroll down button 412b in the main menu item selection screen 410 is pressed, the menu item display 411 displayed on the touch panel 140 is moved in a direction corresponding to the pressed scroll button.

Thereafter, it is determined whether the user has pressed the OK button 418 or the return button 419b in the menu list display screen 415 (step S905). If the OK button 418 in the menu list display screen 415 has been pressed (step S905), the screen corresponding to the menu item displayed in the menu item display 416 when the OK button 418 was pressed is displayed, as shown in FIGS. 3 and 7 (step S917). For example, when the text "SCENE SELECTION" is displayed in the menu item display 416 and the OK button 418 is pressed, the setting screen 420 of "SCENE SELECTION" is displayed on the touch panel 140 (step S917). However, if the return button 419b is pressed (step S905), the main menu item selection screen 410 is displayed on the touch panel 140 (step S902). When the scroll up button 417a or the scroll down button 417b in the menu list display screen 415 is pressed, the display of the menu item display 416 displayed on the touch panel 140 is moved in a direction corresponding to the pressed scroll button. When the "X" button 419a in the menu list display screen 415 is pressed, the display screen 300 is displayed on the touch panel 140.

However, if it is determined that the user has not pressed the menu button 302 in the display screen 300 (step S901), it is determined whether the user has pressed the guide button 301 in the display screen 300 (step S906). If the guide button 301 in the display screen 300 has been pressed (step S906), the guide main menu item selection screen 500 is displayed on the touch panel 140, as shown in FIGS. 3 and 8 (step S907).

However, if neither the guide button 301 nor the menu button 302 in the display screen 300 has been pressed by the user, the process loops until either one is pressed (step S901 and step S906).

Subsequently, it is determined whether the user has pressed one of the selection buttons 501 to 504 or the return button 505 in the guide main menu item selection screen 500 (step S908). If one of the selection buttons 501 to 504 in the guide main menu item selection screen 500 has been pressed (step S908), the screen corresponding to the pressed selection button is displayed, as shown in FIGS. 3 and 9. For example, if the photograph guide button 501 in the guide main menu item selection screen 500 has been pressed, the guide submenu item selection screen 510 is displayed on the touch panel 140 (step S909). However, if the return button 505 has been pressed (step S908), the display screen 300 is displayed on the touch panel 140 (step S900).

Thereafter, it is determined whether the user has pressed one of the selection buttons 511 to 513 or the return button 514 in the guide submenu item selection screen 510 (step S910). If one of the selection buttons 511 to 513 in the guide submenu item selection screen 510 has been pressed (step S910), it is determined whether the screen corresponding to the pressed selection button is stored in the selected screen storage unit 360 (step S911). However, if the return button 514 has been pressed (step S910), the guide main menu item selection screen 500 is displayed on the touch panel 140 (step S907).

If the screen corresponding to the pressed selection button is not stored in the selected screen storage unit 360 (step S911), a first screen of the screens corresponding to the pressed selection button is displayed on the touch panel 140 (step S912). For example, when the "Select scene" button 511 in the guide submenu item selection screen 510 has been pressed (step S910) and none of the guide description screens 520 corresponding to the "Select scene" button 511 is stored in the selected screen storage unit 360 (step S911), the first screen of the guide description screens 520 is displayed, as shown in FIGS. 3 and 10 (step S912).

However, if one of the selection buttons 511 to 513 in the guide submenu item selection screen 510 has been pressed (step S910) and the screen corresponding to the pressed selection button is stored in the selected screen storage unit 360 (step S911), the screen stored in the selected screen storage unit 360 is displayed (step S913). For example, when the "Select scene" button 511 in the guide submenu item selection screen 510 has been pressed (step S910) and one of the guide description screens 520 corresponding to the "Select scene" button 511 is stored in the selected screen storage unit 360 (step S911), the predetermined screen of the guide description screens 520 is displayed, as shown in FIG. 11 (step S913).

Subsequently, it is determined whether a guide description screen displayed on the touch panel 140 is a guide description screen for setting a function that can be set only by using an external operation member (step S914). If the guide description screen displayed on the touch panel 140 is not a guide description screen for setting a function that can be set only by using an external operation member, but a guide description screen for setting a function that can be set through the touch panel 140 (step S914), it is determined which one of the set button 523, the scroll up button 524a, and the scroll down button 524b has been pressed by the user (step S915). If one of the scroll up button 524a and the scroll down button 524b has been pressed (step S915), the guide description screen displayed on the touch panel 140 is moved in a direction in accordance with the pressed scroll button (step S916). How-ever, if the set button 523 has been pressed (step S915), the setting screen for setting the item displayed in the description display 521 and the setting item display 522 is displayed on the touch panel 140 (step S917). For example, when the text "Let the camera do all the work" is displayed in the description display 521 of the guide description screen 520 and the set button 523 is pressed (step S915), the setting screen 420 of "camera setting" is displayed on the touch panel 140 (step S917).

In addition, when the set button 523 in the guide description screen 520 is pressed, the guide description screen displayed at that time is stored in the selected screen storage unit 360.

Thereafter, it is determined whether the user has pressed one of the selection buttons 422 to 425 or the return button 427 in the setting screen 420 (step S918). If one of the selection buttons 422 to 425 in the setting screen 420 has been pressed (step S918), the function corresponding to the pressed selection button is set (step S921). For example, if the night scene & portrait button. 423 in the setting screen 420 of "scene selection" has been pressed (step S918), a night scene & portrait mode is set for the image pickup apparatus 100 (step S921). However, if the return button 427 has been pressed (step S918), the screen displayed immediately preceding the currently displayed screen on the touch panel 140 is displayed (step S919). For example, in the case where the setting screen 420 is displayed (step S917) after the set button 523 in the guide description screen 520 is pressed (step S915), if the return button 427 is pressed, the guide description screen 520 is displayed on the touch panel 140 (step S919). In this case, since the guide description screen 520 was displayed immediately preceding the current screen (step S920), the process proceeds to step S914. However, in the case where the setting screen 420 is displayed (step S917) after the OK button 418 in the menu list display screen 415 is pressed (step S905), if the return button 427 is pressed (step S918), the menu list display screen 415 is displayed on the touch panel 140 (step S919). In this case, since the menu list display screen 415 was displayed immediately preceding the current screen (step S920), the process proceeds to step S905.

If the guide description screen displayed on the touch panel 140 is a guide description screen for setting a function that can be set only by using an external operation member (step S914), it is determined whether the external operation member indicated in the external-operation-member use instruction 528 has been pressed (step S922). If the external operation member indicated in the external-operation-member use instruction 528 has been pressed (step S922), the function corresponding to the pressed external operation member is set (step S921). For example, as shown in FIG. 22, in the case where the text "Capture a clear image even in backlight" is displayed in the description display 521 of the guide description screen 520, if the backlight button (one of the external operation members mounted on the casing of the image pickup apparatus 100) indicated in the external-operation-member use instruction 528 is pressed (step S922), the backlight correction function of the image pickup apparatus 100 is set.

However, if the external operation member indicated in the external-operation-member use instruction 528 has not yet been pressed (step S922), it is determined whether one of the scroll up button 524a and the scroll down button 524b has been pressed (step S923). If one of the scroll up button 524a and the scroll down button 524b has been pressed (step S923), the guide description screen displayed on the touch panel 140 is moved in a direction in accordance with the pressed scroll button (step S924). However, if one of the scroll up button 524a and the scroll down button 524b has not yet been pressed (step S923), it is determined whether the external operation member indicated in the external-operation-member use instruction 528 has been pressed (step S922).

In addition, when the external operation member indicated in the external-operation-member use instruction 528 in the guide description screen 520 is pressed (step S922), the guide description screen displayed at that time is stored in the selected screen storage unit 360.

FIGS. 24A to 24E illustrate examples of the display screen 300 displayed on the touch panel 140.

Figure 24A:
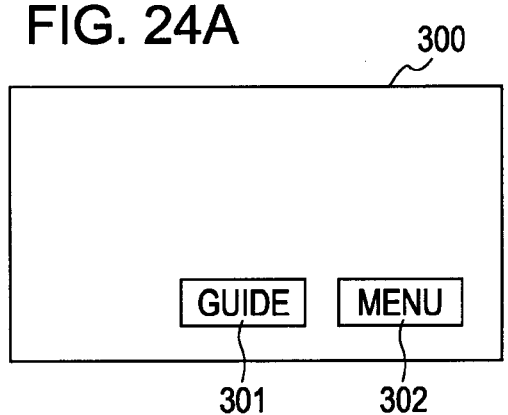
FIGS. 24A to 24E illustrate examples of a display screen displayed on the touch panel.
Figure 24D:
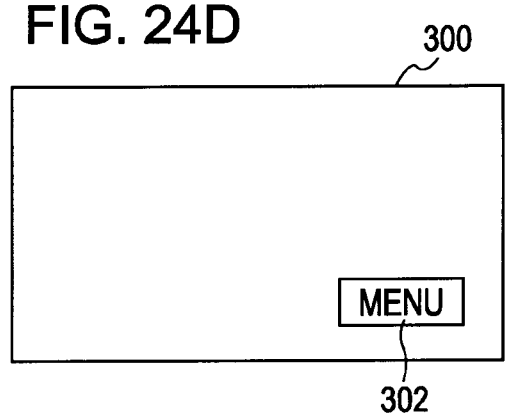
Figure 24B:
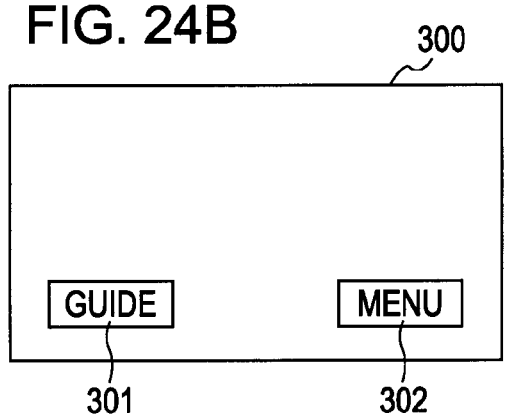
Figure 24E:
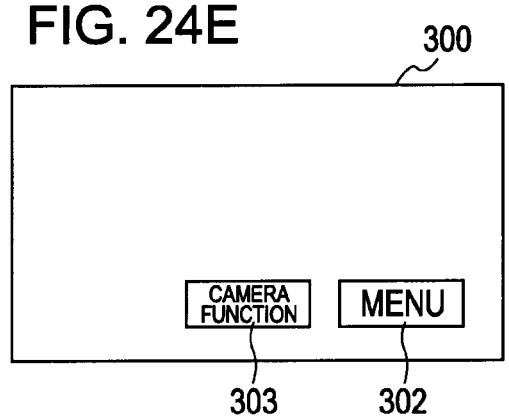
Figure 24C:
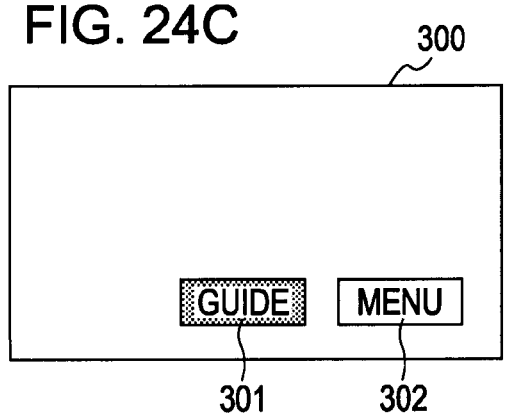

As shown in FIG. 24A, the guide button 301 and the menu button 302 are displayed in the display screen 300. However, as shown in FIG. 24B, the guide button 301 may be displayed in an enlarged form. Alternatively, as shown in FIG. 24C, the guide button 301 and the menu button 302 are displayed in different colors. More specifically, the size, position, color, presence or absence, and text of the guide button 301 may be changeable, and the guide button 301 and the menu button 302 may be rearranged so as to be convenient for the users. This display method increases the viewability of the display screen 300 and prevents the users from performing an erroneous operation. Thus, even users who are not familiar with the operation of the image pickup apparatus 100 and who are target users of the guide function can easily recognize the presence of the guide button 301, and therefore, can easily use the image pickup apparatus 100. The size and position of the guide button 301 may be changed in accordance with the use frequency of the user.

In addition, the display of the display screen 300 may be changed in accordance with the individual user. For example, when an experienced user uses the image pickup apparatus 100, only the menu button 302 may be displayed in the display screen 300, as shown in FIG. 24D. Alternatively, as shown in FIG. 24E, a camera function button 303 that is used for setting one of the frequently used functions may be displayed in place of the guide button 301.

The description above has been made with reference to the case where a normal operation mode is set for the image pickup apparatus 100.

The case where a simple operation mode is set for the image pickup apparatus 100 is described next. In the simple operation mode, almost all functions are automatically set without user intervention. Only the frequently used basic functions (specific functions) can be set by the user.

Accordingly, when the simple operation mode is set for the image pickup apparatus 100, only menus regarding the basic functions that the user can set are displayed on the touch panel 140. To set the simple operation mode for the image pickup apparatus 100, the user presses a "simple" button, which is one of the external operation members. In addition to pressing the "simple" button, the simple operation mode can be set using the touch panel 140. Examples of the basic functions include a night-shot function, a flash function, and a still image recording function.

FIG. 25 illustrates an example of transition of a display screen on the touch panel 140 when the simple operation mode is set for the image pickup apparatus 100.

As shown in FIG. 25, when the simple operation mode is set for the image pickup apparatus 100, a simple display 304 is displayed in the display screen 300. The simple display 304 is an image indicating that a simple operation mode is set for the image pickup apparatus 100.

When the menu button 302 in the display screen 300 is pressed, a simple operation menu selection screen 430 is displayed on the touch panel 140.

Only selection buttons used for setting the basic functions are displayed in the simple operation menu selection screen 430. For example, a recording format button 432, a beep sound button 433, a date and time adjustment button 434, and a display guide button 435 are displayed in the simple operation menu selection screen 430.

Figure 26:
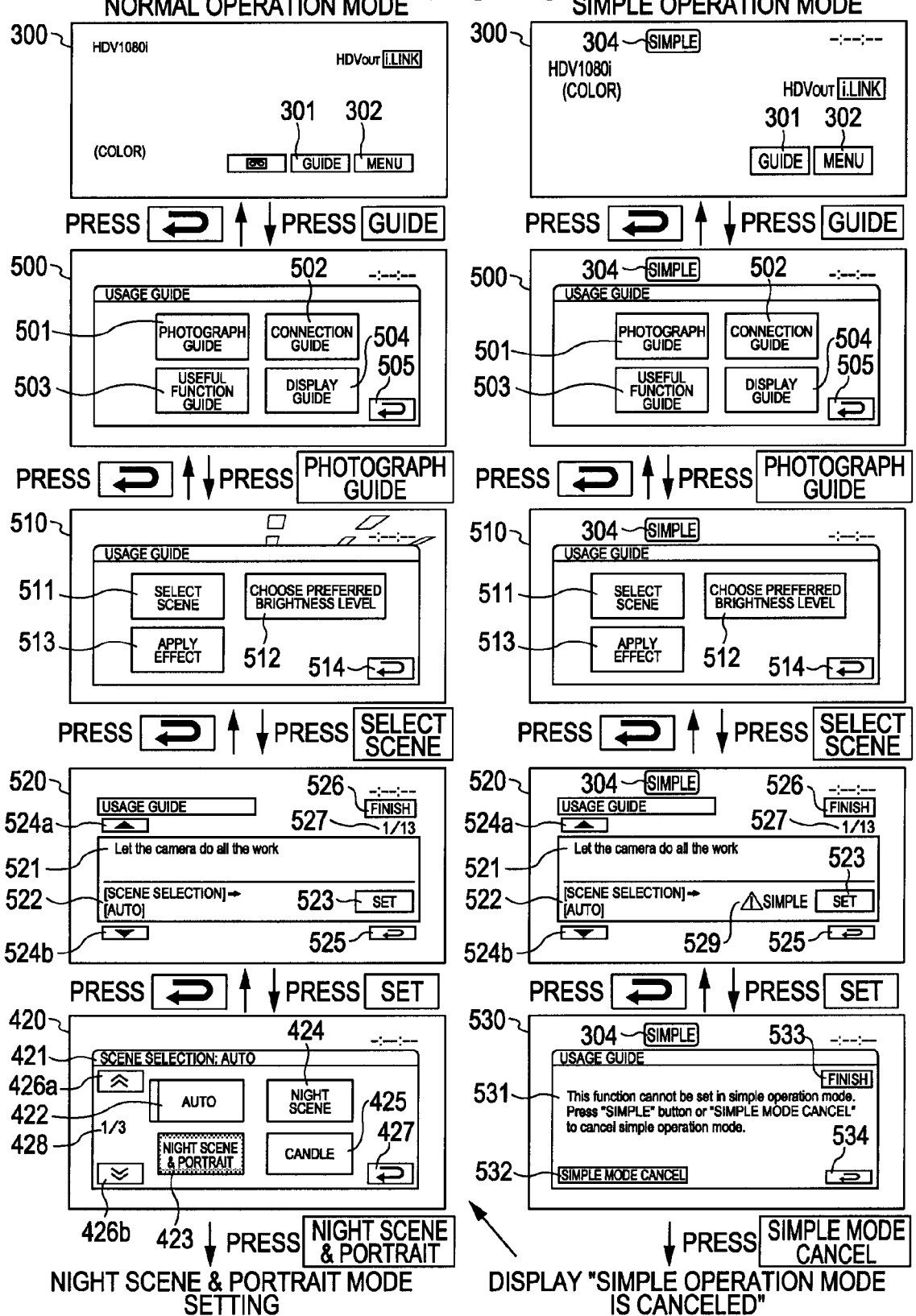
FIG. 26 illustrates examples of transition of a display screen on the touch panel when the simple operation mode is set for the image pickup apparatus and when a normal operation mode is set for the image pickup apparatus.

FIG. 26 illustrates examples of transition of a display screen on the touch panel 140 when the simple operation mode is set for the image pickup apparatus 100 and when the normal operation mode is set for the image pickup apparatus 100.

Even in the case where the simple operation mode is set for the image pickup apparatus 100, when the guide button 301 in the display screen 300 is pressed, the guide main menu item selection screen 500 is displayed on the touch panel 140. Similarly, for example, when the photograph guide button 501 in the guide main menu item selection screen 500 is pressed, the guide submenu item selection screen 510 is displayed on the touch panel 140. Furthermore, for example, the "Select scene" button 511 in the guide submenu item selection screen 510 is pressed, the guide description screen 520 is displayed on the touch panel 140. However, in the simple operation mode, the simple display 304 is displayed in each of the guide main menu item selection screen 500, the guide submenu item selection screen 510, and the guide description screen 520. This feature is different from the features in the normal operation mode.

As described above, when the simple operation mode is set for the image pickup apparatus 100, only the selection buttons used for setting the basic functions are displayed in the simple operation menu selection screen 430 as selection buttons. However, the selection buttons displayed when the guide button 301 in the display screen 300 is pressed are similar to those displayed in the normal operation mode. This display method can show the functions provided by the image pickup apparatus 100 on the basis of the purpose of the operation or the effect of the operation. Accordingly, this method allows a user who has set the functions only in the simple operation mode to learn the advanced operations of the image pickup apparatus 100.

In the case where the simple operation mode is set for the image pickup apparatus 100, if the function displayed in the guide description screen 520 cannot be set, a setting disabled notification 529 indicating that the function cannot be set in the simple operation mode is displayed. For example, as shown in FIG. 26, a symbol and the text "SIMPLE" serving as the setting disabled notification 529 are displayed. However, even in such a case, the set button 523 is displayed in the guide description screen 520 so that the user can navigate to the setting of the function displayed in the guide description screen 520.

For example, as shown in FIG. 26, in the case where the text "Let the camera do all the work" is displayed in the description display 521 of the guide description screen 520, when the set button 523 is pressed, a simple operation mode exiting confirmation screen 530 is displayed on the touch panel 140. Note that the functions that can be set in the simple operation mode can be set as in the normal operation mode.

The simple operation mode exiting confirmation screen 530 is a start screen for the user to navigate to the setting screen of the function that cannot be set in the simple operation mode.

The simple display 304, a message display 531, a simple mode cancel button 532, a finish button 533, and a return button 534 are displayed in the simple operation mode exiting confirmation screen 530.

The message display 531 displays a message indicating that the function desired by the user can be set after the simple operation mode is canceled. For example, the message "This function cannot be set in simple operation mode. Press "SIMPLE" button or "SIMPLE MODE CANCEL" to cancel simple operation mode." is displayed in the message display 531. The "SIMPLE" button is the external operation member that was used for setting the simple operation mode.

The simple mode cancel button 532 is used for canceling the simple operation mode.

The functions of the finish button 533 and the return button 534 are similar to those of the other finish buttons and return buttons described above.

When the set button 523 in the guide description screen 520 is pressed, the guide description screen displayed at that time is stored in the selected screen storage unit 360. By storing the guide description screen displayed when the set button 523 is pressed, the image pickup apparatus 100 can promptly display the guide description screen used by the user when the user uses the image pickup apparatus 100 next time. Since the possibility of the user selecting the same function for the next time usage is high, the user can immediately perform the setting operation. In addition, when the user cancels the setting, the user needs to operate through the screen that is the same as that used for the setting. In such a case, the image pickup apparatus 100 can promptly display the guide description screen that was used by the user when the user performed the setting. Accordingly, even when the user cancels the setting, the user can immediately perform the setting cancel operation.

For example, when the simple operation mode exiting confirmation screen 530 is displayed and the user presses the simple mode cancel button 532 or the "SIMPLE" button, which is one of the external operation members, the message "The simple operation mode is canceled." is displayed on the touch panel 140. Thus, the simple operation mode is canceled. Thereafter, the setting screen 420 of scene selection is displayed, as shown in FIGS. 7 and 26. When the night scene & portrait button 423 in the setting screen 420 is pressed, the night scene and portrait mode is set for the image pickup apparatus 100. If the return button 427 in the setting screen 420 is pressed, the screen does not return to the simple operation mode exiting confirmation screen 530, but the setting screen 420 displayed on the touch panel 140 is changed to the guide description screen 520. When the user wants to set the simple operation mode again, the user needs to press the "SIMPLE" button.

As described above, when the user wants to use a function that cannot be set in the simple operation mode among a variety of functions of the image pickup apparatus 100, the user can navigate to the setting screen of the desired function after the purpose of the operation or the effect of the operation is displayed and the simple operation mode is canceled. This setting method helps the users who have used only functions in the simple operation mode to easily be aware of the presence of a variety of functions and set the functions. Accordingly, this method allows a user who has set the functions only in the simple operation mode to learn the advanced operations of the image pickup apparatus 100.

The above-described method for setting the functions in the simple operation mode can be employed for the functions that can be set using the touch panel 140. A method for setting the functions in the simple operation mode using only the external operation members is described next.

FIG. 27 illustrates examples of transition of a display screen on the touch panel 140 when the simple operation mode is set for the image pickup apparatus 100 and when the normal operation mode is set for the image pickup apparatus 100.

As in the case of FIG. 22, in this example, in order to capture a clear image even in backlight conditions, an operation in which a user presses the backlight button (not shown), which is one of the external operation members, to set a backlight correction function using a guide function is described next.

As described above, when the display screen 300 is displayed on the touch panel 140 in the simple operation mode, the user sequentially presses the guide button 301 and the like so as to display the guide description screen 520.

As shown in FIG. 27, the setting disabled notification 529 is displayed in the guide description screen 520 used for setting the external operation member setting function. In addition, the external-operation-member use instruction 528 is displayed in the guide description screen 520, in place of displaying the set button 523.

For example, as shown in FIG. 27, in the case where the text "Capture a clear image even in backlight" is displayed in the description display 521 of the guide description screen 520, when the backlight button (i.e., the external operation member mounted on the casing of the image pickup apparatus 100) indicated in the external-operation-member use instruction 528 is pressed, the simple operation mode exiting confirmation screen 530 is displayed on the touch panel 140.

The simple operation mode exiting confirmation screen 530 is used for canceling a simple operation mode in order to set a function that cannot be set in a simple operation mode.

The simple operation mode exiting confirmation screen 530 includes the simple display 304, the message display 531, the simple mode cancel button 532, the finish button 533, and the return button 534. These are similar to those described in FIG. 26.

For example, in the case where the simple operation mode exiting confirmation screen 530 is displayed, when the simple mode cancel button 532 or the "SIMPLE" button, which is an external operation member, is pressed, the message "The simple operation mode is canceled." is displayed on the touch panel 140. Thus, the simple operation mode is canceled. Thereafter, the display screen 300 is displayed, as shown in FIGS. 4 and 27. If the backlight button is pressed after the simple operation mode is canceled, the backlight correction function is set for the image pickup apparatus 100.

When the guide description screen 520 or the simple operation mode exiting confirmation screen 530 is displayed on the touch panel 140, the simple operation mode has not been canceled. Accordingly, even if the backlight button is pressed, the backlight correction function is not set for the image pickup apparatus 100. At that time, the user can set the functions that can be set in a simple operation mode in the same manner as in a normal operation mode.

As described above, when the user wants to use a function that cannot be set in the simple operation mode among a variety of functions of the image pickup apparatus 100, the user can navigate to the setting screen of the desired function after the effect of the operation and the status of the operation are displayed and the simple operation mode is canceled. This setting method helps the users who have used only functions in the simple operation mode to easily be aware of the presence of a variety of functions and set the functions. Accordingly, this method allows a user who has set the functions only in the simple operation mode to learn the advanced operations of the image pickup apparatus 100.

In addition, when the external operation member indicated in the external-operation-member use instruction 528 of the guide description screen 520 is pressed, the guide description screen displayed at that time is stored in the selected screen storage unit 360. By storing the guide description screen displayed when the external operation member is pressed, the image pickup apparatus 100 can promptly display the guide description screen used by the user when the user uses the image pickup apparatus 100 next time. Since the possibility of the user selecting the same function for the next time usage is high, the user can immediately perform the setting operation.

The display screen similar to that displayed on the touch panel 140 may be displayed on the viewfinder 150. In addition, an image signal corresponding to the display screen similar to that displayed on the touch panel 140 may be output from the output terminal 160 so that an external apparatus displays the screen.

As described above, according to the present embodiment of the present invention, the display screen 300 is displayed on the touch panel 140 as an initial screen. The display screen 300 serves as a start screen from which the user navigates to a guide function, which is an operation help function that assists the user to operate the image pickup apparatus 100. The display screen 300 includes the guide button 301. By pressing the guide button 301, the user can navigate to the setting screen through the descriptions of the effect of the function or the photographing and playback scenes supported by the function. Thus, the user can select and set the desired function.

In addition, even users who are unfamiliar with the operation of the image pickup apparatus 100 can satisfactorily set the functions in a simple manner without opening the operation manual of the image pickup apparatus 100. Furthermore, by disposing the guide button 301 and the menu button 302 in the display screen 300 that is an initial screen on the touch panel 140, the guide function is provided to the users. Accordingly, two starting points to the menu screens for the experienced users and inexperienced users are disposed next to each other. Thus, the display screen 300 can assist a wide variety of users to operate the image pickup apparatus 100.

Furthermore, by disposing all the buttons that serve as starting points to the guide functions, which assist the users to operate the image pickup apparatus 100, in the display screen 300 that is an initial screen on the touch panel 140, a wide variety of users can easily operate the image pickup apparatus 100 as well as the inexperienced users.

Still furthermore, by using the advantage of a touch panel, the image pickup apparatus 100 can provide a simple and intuitive operation method for the users who operate the image pickup apparatus 100 for the first time or are not familiar with the operation of the image pickup apparatus 100. As used herein, the term "the advantage of a touch panel" means that an entrance to a guide function can be disposed in a screen of the touch panel 140 on which a captured image and a playback image that almost all users view are displayed.

In this way, when the user sets a desired function, the operation of the setting can be simplified.

Although the present invention has been described in terms of the presently preferred embodiment with the following correspondence between the features of the claims and the specific elements disclosed in the embodiment of the present invention, it should be understood by those skilled in the art that various modifications, combinations, sub-combinations and alterations may occur depending on design requirements and other factors insofar as they are within the scope of the appended claims or the equivalents thereof.

That is, the term "touch panel" used in the claims corresponds to, for example, the touch panel 140.

The term "menu screen display controlling means" used in the claims corresponds to, for example, the display control unit 350.

The term "guide screen display controlling means" used in the claims corresponds to, for example, the display control unit 350.

The term "menu button" used in the claims corresponds to, for example, the menu button 302. The term "guide button" used in the claims corresponds to, for example, the guide button 301.

The term "setting screen" used in the claims corresponds to, for example, the setting screen 420.

The term "selected screen storage means" used in the claims corresponds to, for example, the selected screen storage unit 360.

The term "guide screen" that is displayed immediately preceding the setting screen among guide screens sequentially displayed by the guide screen display controlling means corresponds to, for example, the guide description screen 520.

The term "button" used in the claims for setting a predetermined function and displayed in place of the guide button corresponds to, for example, the camera function button 303.

The term "simple operation mode setting means" used in the claims corresponds to, for example, the operation unit 370. The term "guide screen for displaying a cancel button for canceling a simple operation mode or an operation description for canceling the simple operation mode" corresponds to, for example, the simple operation mode exiting confirmation screen 530.

The term "operation member" used in the claims corresponds to, for example, the operation unit 370.

In some claims, the term "guide screen for displaying a cancel button for canceling a simple operation mode or an operation description for canceling the simple operation mode" corresponds to, for example, the simple operation mode exiting confirmation screen 530.

The step "controlling a menu screen display" in the claims corresponds to, for example, step S902 and step S905. The step "controlling a guide screen display" in the claims corresponds to, for example, step S907, step S909, and step S913. The step "controlling a display" in the claims corresponds to, for example, step S900.

Furthermore, the steps of processing described in the exemplary embodiment above may be considered as a method for executing the series of processing or may be considered as a computer-readable program that causes a computer to execute the series of processing or a recording medium that stores the computer-readable program.

What is claimed is:

1. A image pickup apparatus, comprising:
  a touch panel unit configured to display a variety of screens, each including a plurality of buttons displayed therein, the touch panel unit allowing a user to select a desired button from among the plurality of buttons;
  a menu screen display controlling unit configured to control the touch panel so as to sequentially display menu screens through which the user navigates to a setting screen for setting a predetermined function by a predetermined operation in accordance with the selected buttons;
  a guide screen display control unit configured to control the touch panel unit so as to sequentially display guide screens through which the user navigates to the setting screen in accordance with the selected buttons in a path different from a path of the menu screens, each of the guide screens displaying a button or description regarding at least one of a purpose and an effect of the operation; and a simple operation mode setting unit configured to set a simple operation mode in which only particular functions are capable of being set, wherein an initial screen of the touch panel includes a menu button for advancing to the menu screen and a guide button for advancing to the guide screen, and when the simple operation mode is set by the simple operation mode setting unit and a setting screen displayed after the guide screens are sequentially displayed by the guide screen display control unit is a setting screen of a function not capable of being set in the simple operation mode, one of a cancel button to cancel the simple operation mode or a description of an operation to cancel the simple operation mode is displayed in the guide screens that are displayed immediately preceding the setting screen, wherein the setting screen displayed after the menu screens sequentially displayed by the menu screen display controlling unit, is the same as the setting screen displayed after the guide screens are sequentially displayed by the guide screen display controlling unit if the functions to be set are the same.

2. The image pickup apparatus according to claim 1, wherein the menu button and the guide button are displayed on the touch panel when the image pickup apparatus is powered on.

3. The image pickup apparatus according to claim 1, further comprising:

a selected screen storage unit configured to store, when the setting screen is displayed on the touch panel unit after the guide screens are sequentially displayed, the guide screens displayed immediately preceding the setting screen, wherein when the guide screen display control unit displays a guide screen in a guide path the same as that of a guide screen stored in the selected screen storage unit, the guide screen display control unit displays the guide screen stored in the selected screen storage unit immediately preceding the setting screen.

4. The image pickup apparatus according to claim 1, wherein the guide screens displayed immediately preceding the setting screen among the guide screens sequentially displayed by the guide screen display control unit is a screen for displaying the purpose or effect of only one operation per screen so as to guide a user to a setting screen regarding the purpose or effect of the operation.

5. The image pickup apparatus according to claim 1, wherein a button to set a predetermined function is displayed in the initial screen of the touch panel unit in place of the guide button when a predetermined operation is performed.

6. The user guide apparatus according to claim 1, wherein when the simple operation mode is set by the simple operation mode setting unit and a setting screen navigated to by the guide screens is a setting screen of a function not capable of being set in the simple operation mode, a cancel button to cancel the simple operation mode is displayed.

7. The user guide apparatus according to claim 1, where when the simple operation mode is set by the simple operation mode setting unit and a setting screen navigated to by the guide screens is a setting screen of a function not capable of being set in the simple operation mode, a description of an operation to cancel the simple operation mode is displayed.

8. An image pickup apparatus, comprising:

an operation member mounted on a casing of the image pickup apparatus, the operation member configured to set a predetermined function through a predetermined operation;

a touch panel unit configured to display a variety of screens, each including a plurality of buttons displayed therein, the touch panel unit allowing a desired button to be selected from among the plurality of buttons;

menu screen display means for controlling the touch panel so as to sequentially display menu screens through which the user navigates to a setting screen for setting a predetermined function by a predetermined operation in accordance with the selected buttons;

guide screen display means for controlling the touch panel unit so as to sequentially display guide screens through which the user navigates to the setting screen in accordance with the selected buttons in a path different from a path of the menu screens, each of the guide screens displaying a button or description regarding at least one of a purpose and an effect of an operation; and means for setting a simple operation mode in which only particular functions are capable of being set, wherein an initial screen of the touch panel includes an a menu button for advancing to the menu screen and a guide button for advancing to the guide screen, and when the simple operation mode is set by the means for setting the simple operation mode and a setting screen displayed after the guide screens are sequentially displayed by the guide screen display means is a setting screen of a function not capable of being set in the simple operation mode, one of a cancel button to cancel the simple operation mode or a description of an operation to cancel the simple operation mode is displayed in the guide screens that are immediately preceding the setting screen, wherein the setting screen displayed after the menu screens sequentially displayed by the menu screen display means, is the same as the setting screen displayed after the guide screens are sequentially displayed by the guide screen means if the functions to be set are the same.

9. A method for controlling a display of an image pickup apparatus, the image pickup apparatus including a touch panel unit configured to display a variety of screens, each including a plurality of buttons displayed therein, the touch panel unit allowing a user to select a desired button from among the plurality of buttons, the method comprising:

controlling the touch panel unit so as to sequentially display menu screens through which the user navigates to a setting screen to set a predetermined function by a predetermined operation in accordance with the selected buttons;

controlling the touch panel unit so as to sequentially display guide screens through which the user navigates to the setting screen in accordance with the selected buttons in a path different from a path of the menu screens, each of the guide screens displaying a button or description regarding at least one of a purpose and an effect of the operation;

setting a simple operation mode in which only particular functions are capable of being set;

controlling the touch panel so as to display a menu button to advance to the menu screen and a guide button for advancing to the guide screen in an initial screen of the touch panel; and displaying, when the simple operation mode is set and a setting screen displayed after the guide screens are sequentially displayed, a setting screen of a function not capable of being set in the simple operation mode, one of a cancel button to cancel the simple operation mode or a description of an operation to cancel the simple operation mode, in the guide screens that are displayed immediately preceding the setting screen, wherein the setting screen displayed after the menu screens sequentially displayed is the same as the setting screen displayed after the guide screens are sequentially displayed if the functions to be set are the same.

10. A non-transitory computer-readable storage medium storing program code for causing a computer to execute a method for controlling a display of an image pickup apparatus, the image pickup apparatus including a touch panel unit configured to display a variety of screens, each including a plurality of buttons displayed therein, the touch panel unit allowing a user to select a desired button from among the plurality of buttons, the method comprising:

controlling the touch panel unit so as to sequentially display menu screens through which the user navigates to a setting screen to set a predetermined function by a predetermined operation in accordance with the selected buttons;

controlling the touch panel unit so as to sequentially display guide screens through which the user navigates to the setting screen in accordance with the selected buttons in a path different from a path of the menu screens, each of the guide screens displaying a button or description regarding at least one of a purpose and an effect of the operation;

setting a simple operation mode in which only particular functions are capable of being set;

controlling the touch panel so as to display a menu button to advance to the menu screen and a guide button for advancing to the guide screen in an initial screen of the touch panel; and displaying, when the simple operation mode is set and a setting screen displayed after the guide screens are sequentially displayed, a setting screen of a function not capable of being set in the simple operation mode, one of a cancel button to cancel the simple operation mode or a description of an operation to cancel the simple operation mode, in the guide screens that are displayed immediately preceding the setting screen, wherein the setting screen displayed after the menu screens sequentially displayed is the same as the setting screen displayed after the guide screens are sequentially displayed if the functions to be set are the same.

11. A user guide apparatus comprising:

a touch panel unit configured to display a variety of screens, each including a plurality of buttons displayed therein, the touch panel allowing a desired button to be selected from among the plurality of buttons;

a menu screen display controlling unit configured to control the touch panel so as to sequentially display menu screens through which a user navigates to a setting screen for setting a predetermined function by a predetermined operation in accordance with the selected buttons; and a guide screen display controlling unit configured to control the touch panel unit so as to sequentially display guide screens through which the user navigates to the setting screen in accordance with the selected buttons in a path different from a path of the menu screens, each of the guide screens displaying a button or description regarding at least one of a purpose and an effect of the operation; and a simple operation mode setting unit configured to set a simple operation mode in which only particular functions are capable of being set, wherein an initial screen of the touch panel includes a menu button for advancing to the menu screen and a guide button for advancing to the guide screen, and when the simple operation mode is set by the simple operation mode setting unit and a setting screen displayed after the guide screens are sequentially displayed by the guide screen display control unit is a setting screen of a function not capable of being set in the simple operation mode, one of a cancel button to cancel the simple operation mode or a description of an operation to cancel the simple operation mode is displayed in the guide screens that are displayed immediately preceding the setting screen, wherein the setting screen displayed after the menu screens sequentially displayed by the menu screen display controlling unit, is the same as the setting screen displayed after the guide screens are sequentially displayed by the guide screen display controlling unit if the functions to be set are the same.

12. An image pickup apparatus comprising:

an operation member mounted on a casing of the image pickup apparatus, the operation member configured to set a predetermined function by performing a predetermined operation;

a touch panel unit configured to display a variety of screens, each including a plurality of buttons displayed therein, the touch panel allowing a desired button to be selected from among the plurality of buttons;

a menu screen display controlling unit configured to control the touch panel so as to sequentially display menu screens through which the user navigates to a setting screen for setting a predetermined function by a predetermined operation in accordance with the selected buttons;

a guide screen display controlling unit configured to control the touch panel unit so as to sequentially display guide screens through which the user navigates to the setting screen in accordance with the selected buttons in a path different from a path of the menu screens, each of the guide screens displaying a button or description regarding at least one of a purpose and an effect of the operation; and a simple operation mode setting unit configured to set a simple operation mode in which only particular functions are capable of being set, wherein an initial screen of the touch panel includes a button for advancing to the menu screen and a guide button for advancing to the guide screen, and when the simple operation mode is set by the simple operation mode setting unit and a setting screen displayed after the guide screens are sequentially displayed by the guide screen display control unit is a setting screen of a function not capable of being set in the simple operation mode, one of a cancel button to cancel the simple operation mode or a description of an operation to cancel the simple operation mode is displayed in the guide screens that are displayed immediately preceding the setting screen, wherein the setting screen displayed after the menu screens sequentially displayed by the menu screen display controlling unit, is the same as the setting screen displayed after the guide screens are sequentially displayed by the guide screen display controlling unit if the functions to be set are the same.

* * * * *